(12) United States Patent
Harada et al.

(10) Patent No.: US 7,349,015 B2
(45) Date of Patent: Mar. 25, 2008

(54) IMAGE CAPTURE APPARATUS FOR CORRECTING NOISE COMPONENTS CONTAINED IN IMAGE SIGNALS OUTPUT FROM PIXELS

(75) Inventors: Yoshihito Harada, Tokyo (JP); Hiroshi Miyanari, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 803 days.

(21) Appl. No.: 10/841,661

(22) Filed: May 6, 2004

(65) Prior Publication Data

US 2004/0239781 A1 Dec. 2, 2004

(30) Foreign Application Priority Data

May 30, 2003 (JP) ............................. 2003/154909
Jun. 27, 2003 (JP) ............................. 2003/184940

(51) Int. Cl.
*H04N 9/64* (2006.01)
*H04N 5/217* (2006.01)
(52) U.S. Cl. ...................... 348/243; 348/297; 348/308; 250/208.1
(58) Field of Classification Search ................ 348/241, 348/243
See application file for complete search history.

(56) References Cited

U.S. PATENT DOCUMENTS

| 4,556,851 | A | * | 12/1985 | Levine | ........................ 377/63 |
| 5,434,619 | A | * | 7/1995 | Yonemoto | .................... 348/241 |
| 6,025,875 | A | * | 2/2000 | Vu et al. | ..................... 348/241 |
| 6,320,616 | B1 | * | 11/2001 | Sauer | ......................... 348/241 |
| 6,831,685 | B1 | | 12/2004 | Ueno et al. | |

FOREIGN PATENT DOCUMENTS

JP          11-341363          12/1999

* cited by examiner

*Primary Examiner*—Ngoc-Yen Vu
*Assistant Examiner*—James A Meyers
(74) *Attorney, Agent, or Firm*—Canon U.S.A., Inc., IP Division

(57) ABSTRACT

An image capture apparatus includes first and second pixels. Each pixel has a sensor and a reading portion for reading out a signal from the sensor to an output line. The apparatus further includes a correcting section for changing a correction signal in accordance with waiting time in which signals from the first and second pixels are held and for correcting noise components contained in image signals output from the first and second pixels in accordance with the correction signal. Waiting times in which the image signals are held in the first and second pixels are different from each other and the noise components are generated due to the different waiting times.

11 Claims, 14 Drawing Sheets

FIG. 5
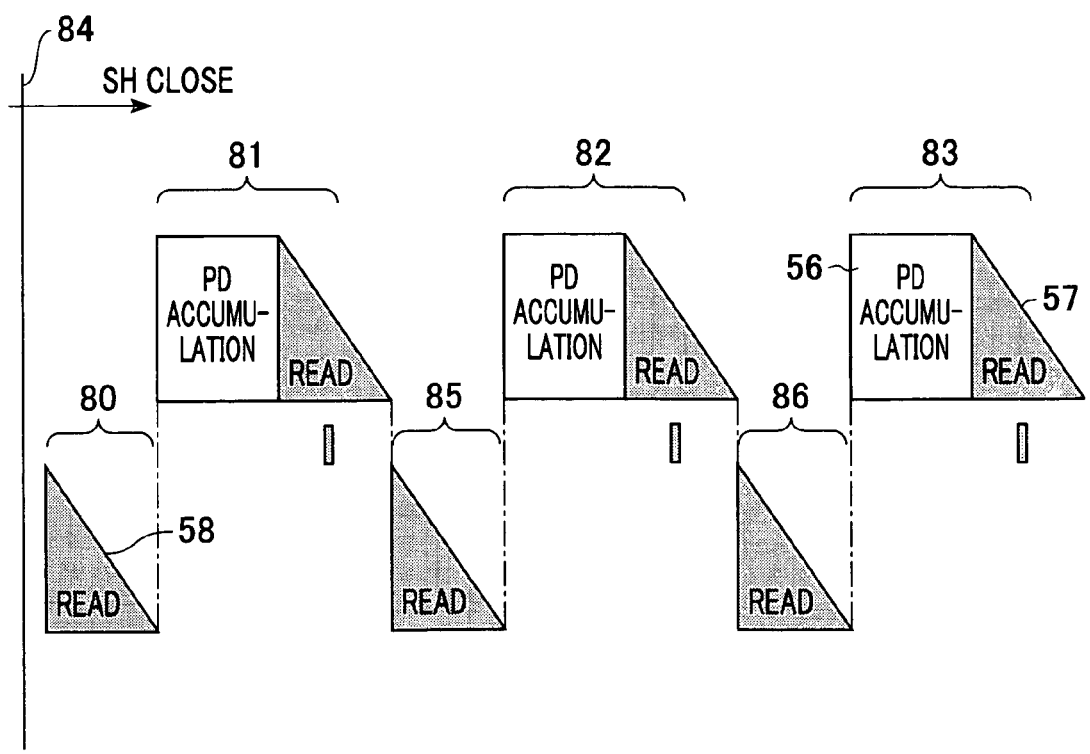
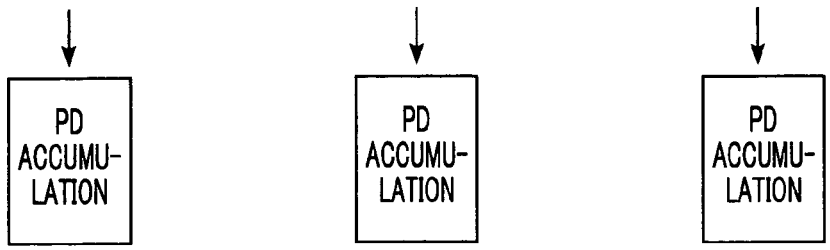

FIG. 11
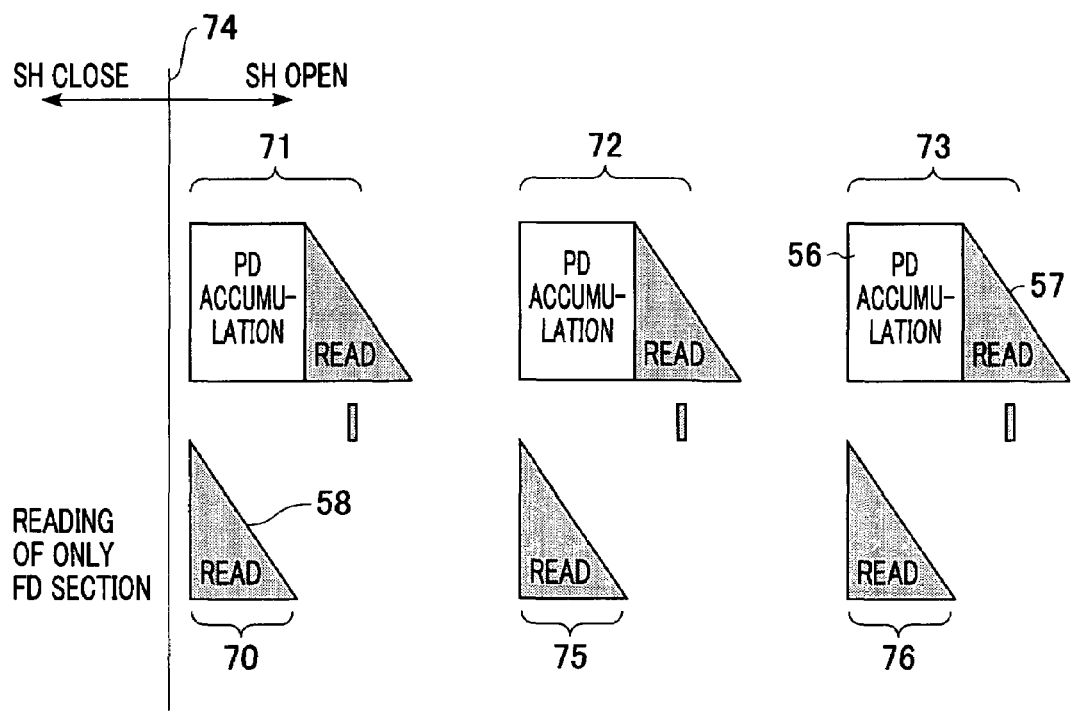
SUBTRACT SIGNAL OF ONLY FD SECTION READ IMMEDIATELY BEFORE EACH FRAME
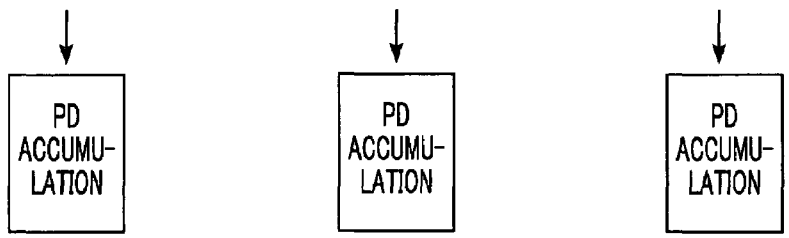

IMAGE CAPTURE APPARATUS FOR CORRECTING NOISE COMPONENTS CONTAINED IN IMAGE SIGNALS OUTPUT FROM PIXELS

BACKGROUND OF THE INVENTION

1. Field of the Invention

The present invention relates to an image capture apparatus having an image capture device for capturing images of a subject and a driving system for driving the image capture device.

2. Description of the Related Art

FIG. 1 is a circuit diagram of the circuit of an image capture device.

Photodiodes (hereinafter referred to as "PD sections") 101 convert light into electrical charges (i.e., photoelectrical conversion) in accordance with the amount of exposure and accumulate the charges. Reference numeral 102 indicates floating diffusion sections (hereinafter referred to as "FD sections"). Upon the end of the accumulation, transfer gates (hereinafter referred to as "TXs") 103 transfer the charges from the PD sections 101 to the corresponding FD sections 102 at the next stages. Reset gates (hereinafter referred to as "RSs") 104 are used to reset the FD sections 102 and the PD sections 101. Floating diffusion amplifiers (hereinafter referred to as "FD amplifiers) 105 convert the charges, photoelectrically converted by the FD sections 102, into voltages. Selection gates (hereinafter referred to as "SELs") 106 serve as selection switches for switching the reading of signals from the FD sections 102. For example, a typical digital camera has a pixel area including several millions of pixels, each defined by one PD section 101, one FD section 102, one TX 103, one RS 104, one FD amplifier 105, and one SEL 106.

A known operation of the image capture device shown in FIG. 1 will now be described.

First, before accumulation of charges, the PD sections 101 and the FD sections 102 are reset once. This is achieved by turning on the TXs 103 and RSs 104. Subsequently, when the TXs 103 and the RSs 104 are turned off, accumulation is started. At this point, since no charges are accumulated in the FD sections 102, first, the SELs 106 are turned, so that signals corresponding to that situation are read out to corresponding vertical output lines (V output lines) 125. As a result, reset noise levels are stored in corresponding circuit-module capacitors 108 provided in an S-n circuit block, the number of capacitors 108 being equal to the number of pixel columns.

When a predetermined amount of time has elapsed, the TXs 103 are turned on, so that the charges stored in the PD sections 101, which are buried photodiodes, are completely transferred to the corresponding FD sections 102 via the corresponding TXs 103. After read-out waiting time has elapsed, the SELs 106 are turned on, so that outputs corresponding to the accumulated charges are read out to the corresponding vertical output lines 125. Then, the signal levels of the outputs are stored in the capacitors 109 via corresponding switches 111. At this point, the reset levels and the signals levels are stored in the capacitors 108 and the capacitors 109, respectively. Thus, turning on read-out switches 115 and 116 to connect the reset levels and the signal levels to a differential amplifier 123 allows "pure" accumulation signals to be extracted.

In general, reset noises are first read, and then signals are read. When this sequence is reversed, while random reset noise cannot be completely eliminated, variations in gate-source voltages (Vgs) across the FD amplifiers 105 can be substantially cancelled. In a typical electronic-shutter mode, therefore, signals are first read, and then immediately, the FD sections 102 are reset again so that reset levels are read.

FIG. 13 illustrates how reading is performed in the image capture device. The upper three waveforms indicate the SELs 106, the RSs 104, and the TXs 103. Signals thereof may also be regarded as gate signals of the respective nMOS transistors of the SELs, 106, the RSs 104, and the TXs 103.

Graphics represented by a square 56 and a triangle 57 below the waveforms represent, in a time axis, an operation for each pixel row in the pixel area. Reference numeral 50 indicates a line at the upper side of the screen and 51 indicates a line in the lower side of the screen. At time 52, the TXs 103 and the RSs 104 are reset in a pulsed manner at the same time, so that the PD sections 101 and the FD sections 102 of all the pixels are simultaneously reset. After the reset is completed, charges generated in response to incident light are stored in the PD sections 101 of all the pixels. The square 56 represents charges being accumulated in the PD sections 101. Time 53 indicates the end of the accumulation. The horizontal length indicates accumulation time Tint. Since the charges in all the pixels are simultaneously transferred at the end of the accumulation, first, in order to ensure that the FD sections 102 contain no charges, the RSs 104 are turned on in a pulsed manner to reset the FD sections 102. Immediately after the reset, the TXs 103 are turned on in a pulsed manner to simultaneously transfer the charges of all the pixels.

At time 54, reading/scanning for each row is started. Time until charges in all the rows are read out refers to waiting time Twait. A vertical scan circuit 121 sequentially selects the rows, thereby performing the scanning/reading.

In a row selected by the SELs 106, signals (S) stored in the FD sections 102 in a waiting state are transferred and stored in the capacitors 108 in response to ON pulses PTS (pulses applied to switching transistors 110) indicated at reference numeral 58. Next, in order to cancel variations in gate-source voltages Vgs of the FD amplifiers 105, only the RSs 104 in the selected row are turned on, so that the FD sections 102 are reset, and pulses PTN go high (i.e., pulses are applied to the switching transistors 111), so that reset levels (N) are stored in the corresponding capacitors 109. After all signals of the pixels in the selected row are stored in the capacitors 108, the number thereof being equal to the number of horizontal pixels, in the S-n circuit (shown in FIG. 1), for example, a pair of horizontal-reading selection switches 117 and 118 are sequentially actuated to sequentially select the signals, for example, from the left-hand side to the right-hand side, for input to the differential amplifier 123. In this manner, outputs from all the pixels in the selected row are scanned and read.

When outputs of all the pixels in one row are scanned and read, the vertical scan circuit 121 selects the next row. Scanning, as described above, is repeated for all the rows, and at time 55, reading from the FD sections 102 ends. The triangle 57 represents a state in which the reading from the FD sections 102 is performed while the rows are scanned vertically, i.e., from the top to the bottom of the screen. A related example is disclosed in Japanese Patent Laid-Open No. 11-341363 (pages 10 to 18, FIG. 9).

In the known example, waiting time Twait, which is time until charges are read out, differs depending on the position of a row from the top of the screen. For example, since the top row is selected first in the row scanning, waiting time Twait therefor is substantially zero. On the other hand, since the bottom row needs to wait until reading of substantially all the rows is finished, waiting time Twait therefor becomes the longest. Since the PD sections 101 and the corresponding FD sections 102 are adjacent to each other, during the waiting period in which reading from the FD sections 102 is waited for, a certain percentage of light that enters the PD sections 101 leak into the adjacent FD sections 102. More specifically, this phenomenon will now be described with reference to the structure shown in FIG. 14.

FIG. 14 is a cross-sectional view of the vicinity of a PD section. Reference numeral 220 denotes a photodiode (PD section), which corresponds to a protection film. A photo-electric conversion portion is formed below the photodiode. Since the PD section 220 has a pn junction structure, photoelectrical conversion and charge accumulation are mainly performed at two junction portions, that is, between a P+ layer 221 and an N layer 222 and between the N layer 222 and a P well layer 223. The charge accumulation region of the PD section 220, which is defined by the P+ layer 221, the N layer 222, and the P well layer 223, is buried. This structure is called a buried photodiode, which prevents the penetration of noise charge from a surface layer, and is superior in that the amount of dark current is small. Reference numeral 224 is an N substrate, which is connected to a power supply. The P well layer 223 is connected to ground. When a voltage is applied to a transfer gate 226, charge is transferred from the PD section to an N+ FD section 225. Three layers are illustrated for aluminum wires 227. Since a CMOS sensor has a larger number of circuit elements in a pixel area than a CCD sensor, the amount of wiring is increased. The N+ FD section 225 corresponds to the gate of a MOS transistor serving as the FD amplifier, which is not shown in FIG. 14. Thus, in practice, the FD amplifier extends to a region outside FIG. 14 through the aluminum wire provided immediately above the FD section 225. Light that has traveled from a subject is supposed to reach the PD section 220 after passing through a microlens 229 and a color filter 228, but some of the light leaks into the FD section 225 through gaps between the aluminum wires 227, as indicated by a light beam 230. Further, even immediately below the PD section 220, some of charges 231, which have been photoelectrically converted, drift and leak into the FD section 225. This leakage also can be regarded as light leakage. As a result, the known technology has disadvantages. Specifically, depending on the waiting time, variations in light leakage within a screen increase the amount of noise that is introduced into image signals. Further, the brightness of a subject varies between the upper side and the lower side of the screen.

SUMMARY OF THE INVENTION

Accordingly, an object of the present invention is to provide an image capture apparatus that provides low-noise image signals.

To achieve the object, an image capture apparatus according to the present invention includes first and second pixels. Each pixel has a sensor and a reading portion for reading out a signal from the sensor to an output line. The apparatus further includes a correcting section for changing a correction signal in accordance with waiting time in which signals from the first and second pixels are held and for correcting noise components contained in image signals output from the first and second pixels in accordance with the correction signal. Waiting times in which the image signals are held in the first and second pixels are different from each other and the noise components are generated due to the different waiting times.

This arrangement can output signals that are held in the pixels for a different amount of time and signals that are held in the pixels for a different amount of time and that contain photoelectric conversion signals. Thereafter, the signals that are held in the pixels for a different amount of time are used to correct the signals that are held in the pixels for a different amount of time and that contain the photoelectric conversion signals. As a result, an image having an improved image quality is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is shows sequences in the first and fourth embodiments of the present invention.

FIG. 11 is shows a sequence in a seventh embodiment of the present invention.

DESCRIPTION OF THE PREFERRED EMBODIMENTS

Preferred embodiments of the present invention will now be described in detail with reference to the accompanying drawings.

First Embodiment

Figure 1:
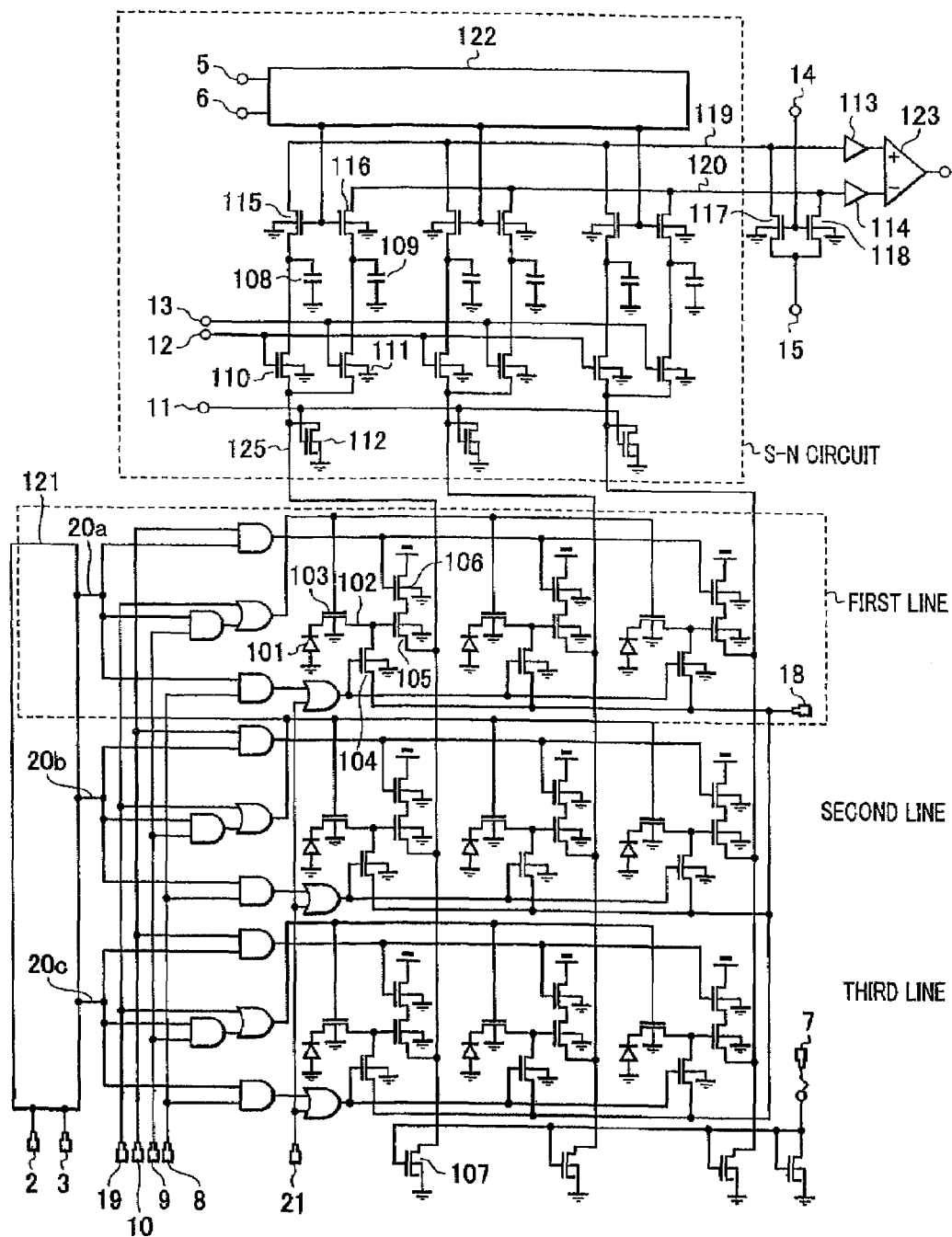
FIG. 1 is a circuit diagram of an image capture device according to embodiments of the present invention and a known example.

FIG. 1 is an equivalent circuit diagram of an image capture device (image capture section) included in an image capture apparatus according to an embodiment of the present invention. The image capture device has pixels arranged in a matrix.

Referring to FIG. 1, reference numeral 101 denotes photodiodes (hereinafter referred to as "PD sections"), which generate photoelectric conversion signals in response to incident light. Reference numeral 102 denotes floating diffusion sections (hereinafter referred to as "FD sections"). Reference numeral 103 denotes transfer gates TXs, which serve as transfer switches for transferring the photoelectric conversion signals generated by the PD sections 101 to the corresponding FD sections 102. The transfer gates 103 and the FD sections 102 constitute holding portions for holding signals from the PD sections 101. Reset gates (RS) 104 serve to reset the FD sections 102, and FD amplifiers 105 serve as reading portions for reading signals from the FD sections 102. The FD amplifiers 105 further have functions for amplifying the signals read from the FD sections 102 and output the amplified signals. Reference numeral 106 denotes selection gates (SEL) 106. Upon application of pulses to the selection gates 106, signals are read from the FD amplifiers 105. After the FD sections 102 are reset, signals corresponding to voltages across the FD sections 102 are output from the FD sections 102. Capacitors 108 store the signals output from the FD sections 102. Capacitors 109 store signals corresponding to voltages across the FD sections 102 after the photo conversion signals are transferred to the FD sections 102 via the transfer gates 103. Switching transistors 110 provide connections between the FD amplifiers 105 and the corresponding capacitors 108. Switching transistors 111 provide connections between the FD amplifiers 105 and the corresponding capacitors 109. Capacitor-discharging transistors 112 cause the capacitors 108 and 109 to be discharged. The capacitors 108 and the switching transistors 110 constitute accumulating portions for accumulating signals from the FD amplifiers 105. The capacitors 109 and the switching transistors 111 constitute accumulating portions for accumulating signals from the FD amplifiers 105. Reference numerals 113 and 114 denote buffers. Switching transistors 115 and 116 switch voltages between the capacitors 108 and 109 in one column and the capacitors 108 and 109 in another column to supply the voltages to the buffers 113 and 114. Resetting transistors 117 and 118 reset the voltages to be input to the corresponding buffers 113 and 114. Reference numeral 119 and 120 denote horizontal output lines, 121 denotes a vertical scan circuit, and 122 denotes a horizontal scan circuit.

A differential amplifier 123 performs differential processing on a plurality of signals. Reference numeral 107 denotes transistors. The transistors 105, 106, and 107 constitute amplifiers, which serve as source-follower amplifiers, only when the corresponding transistors 106 and 107 are turned on. One PD section 101, one FD section 102, and the corresponding transistors 103, 104, 105, and 106 define one pixel. The buffers 113 and 114, the switching capacitors 115 and 116, the horizontal output lines 119 and 120, and the resetting transistors 117 and 118 constitute an output portion for sequentially outputting signals for one line from the capacitors 108 and 109, in which the signals are stored, to the differential amplifier 123.

Figure 2:
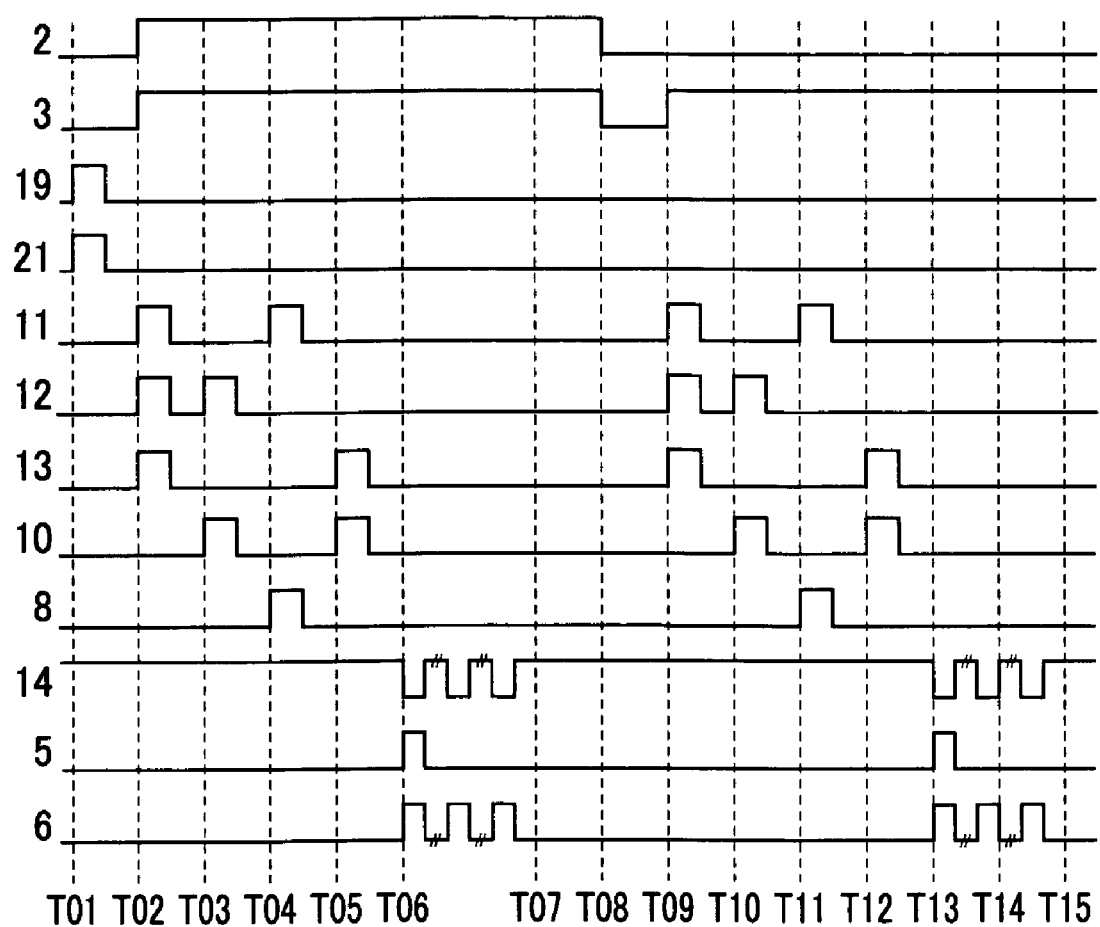
FIG. 2 is a timing chart illustrating an operation of taking a moving image according to an embodiment of the present invention.
Figure 3:
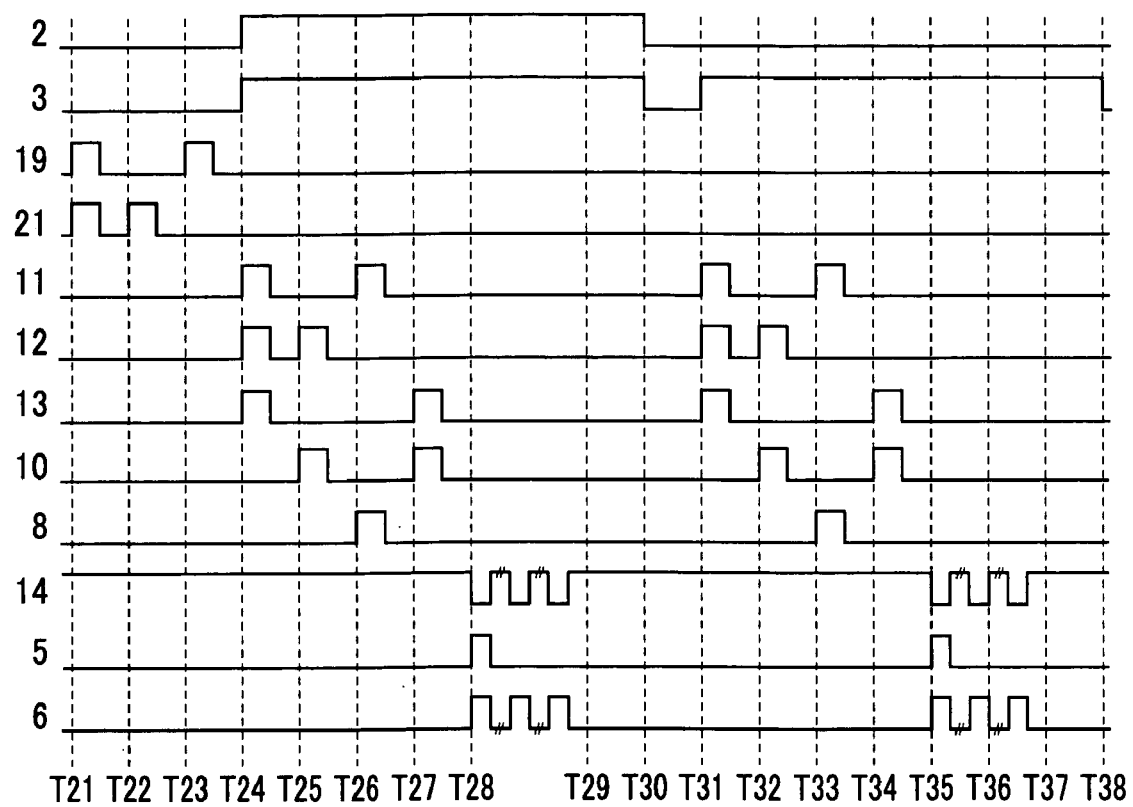
FIG. 3 is a timing chart illustrating an operation of taking a moving image according to the embodiment of the present invention.

FIGS. 2 and 3 are timing charts showing the operation of the circuit shown in FIG. 1. Operations (i.e., a first mode and a second mode) of the circuit shown in FIG. 1 will now be described with reference to FIGS. 1, 2, and 3.

First, a first mode will be described with reference to FIGS. 1 and 2.

At time T01, high pulses are applied to a terminal 19 and a terminal 21, so that the FD sections 102 of all the pixels are reset at the same time and also the PD sections 101 of all the pixels are reset at the same time. At time T02, a vertical-scan start pulse is input to a terminal 2 and a vertical-scan pulse is input to a terminal 3, so that the first line is selected and a signal 20a (not shown in FIG. 2) goes high. Also, at time T02, high pulses are applied to terminals 11, 12, and 13, so that the capacitors 108 and 109 are reset. At time T03, high pulses are applied to terminals 10 and 12, so that signals corresponding to reset voltages and noise signal voltages that result from an accumulation-time difference are read out from the FD amplifiers 105 to the corresponding capacitors 108. The noise signal voltages are voltages that have been accumulated in the FD sections 102 from when the FD sections 102 are reset until signals are subsequently output therefrom. At time T04, high pulses are applied to terminals 8 and 11, so that the FD sections 102 and the capacitors 109 are reset. At time T05, high pulses are applied to terminals 10 and 13, so that signals corresponding to the reset voltages across the FD sections 102 are read out to the corresponding capacitors 109. At time T06, a voltage at terminal 14 changes from high to low so that the horizontal output lines 119 and 120 are reset. At the same time, a horizontal-scan start pulse is input to terminal 5 and a horizontal-scan pulse is input to terminal 6, So that reading from a line memory, which is constituted by the capacitors 108 and 109 in the individual columns, is started. The level of the signal input to terminal 14 is operated with a phase opposite to that of the horizontal scan pulse so as to prevent the interference of the capacitors 108 and 109 in the individual columns. The differential amplifier 123 removes a difference between both the outputs. As a result, the differential amplifier 123 provides noise signal voltages that result from an accumulation-time difference, but that do not contain reset voltage variations (i.e., random noise) and FD amplifier variations (i.e., fixed pattern noise) which differ depending on the pixels.

The operation of the first line in the period from time T02 to time T09 is also performed, after time T09, for all the rows after the second line, until reading of all the rows is completed.

According to the operation described above, after the FD sections 102 of all the pixels are reset at the same time, signals are sequentially read out for each line. Thus, signals read from the pixels in the lower lines have a larger amount of noise-signal voltage component that results from an accumulation-time difference.

Thus, noise signal voltages that result from an accumulation-time difference and that have a different signal level for each line are output from the differential amplifier 123.

Now, a second mode will be described with reference to FIGS. 1 and 3.

The operation for the second mode is performed after the end of the operation for the first mode.

At time T21, high pulses are applied to terminals 19 and 21, so that the FD sections 102 of all the pixels are reset at the same time, and the PD sections 101 of all the pixels are also reset at the same time.

After the reset is completed, an accumulation operation of electric charges (i.e., photoelectric conversion signals) generated in response to light incident on the PD sections 101 of all the pixels is started. After the photoelectric conversion signals are stored for a predetermined amount of time, at time T22, a high pulse is applied to terminal 21 again, so that the FD sections 102 of all the pixels are reset at the same time. Thereafter, at time T23, a high pulse is applied to terminal 19 again, so that the charges stored in the PD sections 101 of all the pixels are transferred to the corresponding FD sections 102 at the same time. After the high pulse goes low, the charges transferred to the FD sections 102 are held. At time T24, a vertical-scan start pulse is input to terminal 2 and a vertical-scan pulse is input to terminal 3, so that the first row is selected and the signal 20a (not shown in FIG. 2) goes high. In addition, at time T24, high pulses are applied to terminals 11, 12, and 13, so that the capacitors 108 and 109 are reset. At time T25, high pulses are applied to terminals 10 and 12, so that signals, corresponding to photoelectric-conversion signal voltages, noise-signal voltages due to an accumulation-time difference, and reset signal voltages, are read out from the FD sections 102 to the corresponding capacitors 108. At time T26, high pulses are applied to terminals 8 and 11, so that the FD sections 102 and the capacitors 109 are reset. At time T27, high pulses are applied to terminals 10 and 13, so that signals corresponding to reset voltages across the FD sections 102 are read out to the corresponding capacitors 109. At time T28, the voltage at terminal 14 changes from high to low, so that the horizontal output lines 119 and 120 are reset. At the same time, a horizontal-scan start pulse is input to terminal 5 and a horizontal-scan pulse is input to terminal 6, so that signal reading from the line memory, which is constituted by the capacitors 108 and 109 in the individual columns, is started. The level of the signal input to terminal 14 is operated with a phase opposite to that of the horizontal scan pulse so as to prevent the interference of the capacitors 108 and 109 in the columns. The differential amplifier 123 removes a difference between the outputs. This processing can provide signal voltages that do not contain reset voltage variations and FD amplifier variations which differ depending on the pixels. Thus, the operation in the second mode can provide signals that do not contain noise components resulting from FD amplifier variations and reset voltage variations, and that have an improved signal-to-noise (S/N) ratio. The operation of the first line in the period from time T24 to time T31 is sequentially performed, after time T31, for all the rows after the second line, until reading of all the rows is completed.

According to the operation described above, after the FD sections 102 of all the pixels are reset, photoelectric conversion signals are transferred from the PD sections 101 to the FD sections 102 at the same time, and then signals are sequentially read out for each line. Thus, signals read from the pixels in the lower lines have a larger amount of noise-signal voltage component that results from an accumulation-time difference.

That is, in the first mode, noise signal voltages (i.e., a signal 58 generated at the time of reading, as shown FIG. 5) that result from an accumulation-time difference and that have a different signal level for each line are output from the differential amplifier 123. On the other hand, in the second mode, voltages (i.e., a photoelectric conversion signal 56 as shown in FIG. 5) corresponding to the photoelectric conversion signals generated by the PD sections 101 and noise signal voltages (i.e., a signal 57 generated at the time of reading, as shown in FIG. 5) that result from an accumulation-time difference and that have a different signal level for each line are output from the differential amplifier 123.

The timing pulses described above and shown in FIG. 2 (the first mode) and FIG. 3 (the second mode) are generated by an image-capture controlling circuit (image-capture controlling section) included in a timing generator described below.

An operation after the signals of all the pixels are read in the first and second modes will now be described with reference to FIG. 4.

Figure 4:
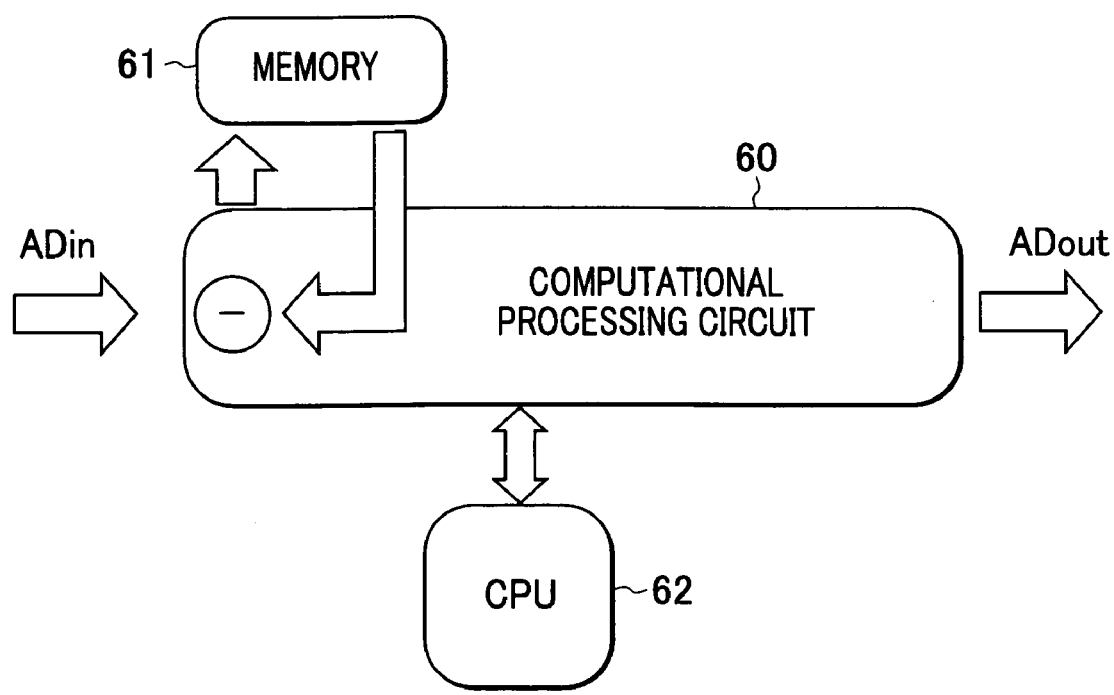
FIG. 4 is a schematic diagram showing a hardware-module for correcting an image obtained through an electronic shutter in the embodiment of the present invention.

The configuration shown in FIG. 4 is provided at the stage subsequent to an analog-to-digital (A/D) converter for converting signals sent from the image capture device shown in FIG. 1 into digital signals. A computational processing circuit 60 includes, for example, a correction circuit (correcting section) for performing differential processing on a plurality of signals and a circuit for generating brightness signals and color-difference signals. A memory (first storing section) 61 stores at least one-frame signals sent from the image capture device. A CPU (central processing unit) 62 controls the computational processing circuit 60 and also controls an image-capturing sequence.

In the first mode, immediately before charges are accumulated in the PD sections 101, signals read from the differential amplifier 123 are temporarily stored in the memory 61 via the computational processing circuit 60. Thereafter, the signals that are stored in the memory 61 and signals that are read from the differential amplifier 123 in the second mode are subjected to differential processing by the computational processing circuit 60.

In this case, the signals read in the first mode are noise signal components that result from an accumulation-time difference, and the signals read in the second mode are the mixtures of the noise signal components resulting from an accumulation-time difference and photo-conversion signal components generated by the PD sections 101. Thus, the computational processing circuit 60 performs differential processing for subtracting a difference between the signals read in the first mode and the signals read in the second mode, thereby providing only the photoelectric conversion signal components.

In this case, the memory 61 may have a capacity capable of storing signals for two frames from the image capture device, so as to temporarily store the signals obtained in the second mode as well.

Figure 8:
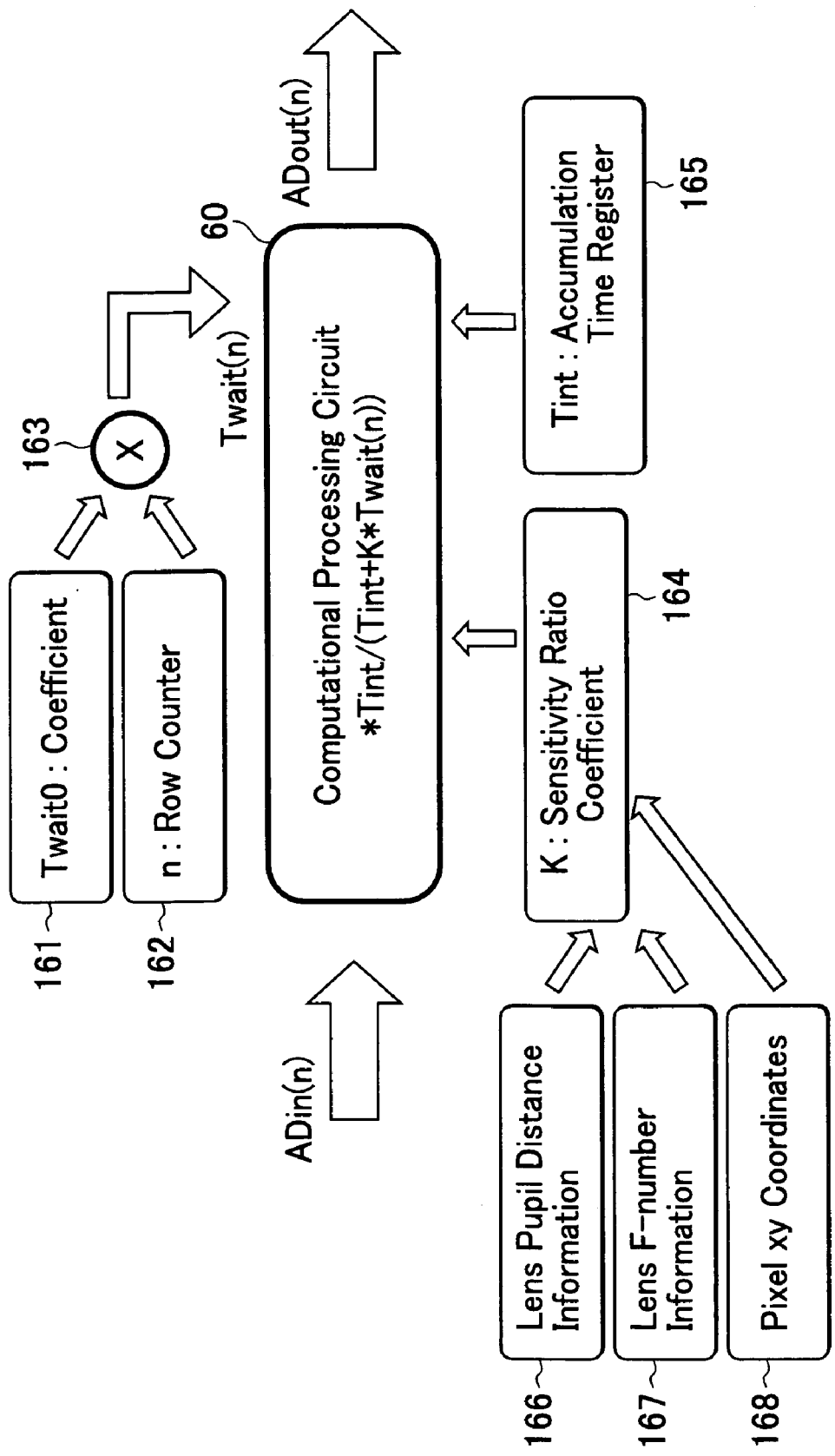
FIG. 8 is a flow chart illustrating a flow for hardware-based correction of an image in a fifth embodiment of the present invention.

The computational processing circuit 60 performs the above-described differential processing operation in response to a control signal sent from a correction controlling section included in the CPU 62 shown in FIG. 8, which is described below.

In the moving-picture mode in the embodiment described above, the photoelectric conversion signals in all the lines of the image capture device can be stored at the same time. Thus, this arrangement is advantageously used for capturing moving images for which a shutter for shielding light that enters the image capture device cannot be used.

In the first embodiment, while reset signals are read in both the first and second modes and noise is removed by the differential amplifier (i.e., noise is removed by two different operations), the reading of the reset signals and the difference operation do not have be performed. That is, the operations at T04 and T05 shown in FIG. 2 do not have to be performed. Further, the differential amplifier 123 and the paths (111, 109, 116, 120, 118, and 114) for reading the reset signals at T04 and T05 may be eliminated.

For example, the arrangement may be such that, immediately before charges are accumulated in the PD sections 101, the signals read in the first mode are temporarily stored in the memory 61 via the computational processing circuit 60. In this case, without the reading and differential processing of the reset signals, while the signals that are read in the first mode are being subtracted from photoelectric conversion signals that have been accumulated in the PD sections in the second mode, have been simultaneously transferred to the FD sections, and that have been read out immediately after the signals were read in the first mode, the resulting signal may be stored.

In such an operation, however, since the computational processing circuit 60 removes three types of noise, i.e., FD amplifier variations, reset voltage variations, and noise that results from an accumulation-time difference, the rate of eliminating noise is reduced compared to a case in which the differential amplifier 123 is used. That is, when noise is removed by two operations, since the differential amplifier 123 is arranged in the image capture device and is relatively close to the pixels, it is possible to remove FD amplifier variations and reset voltage variations without permitting noise to flow through circuits, such as an amplifier and an image-signal processing circuit 205, which are provided at subsequent stages. In contrast, when noise is removed by one operation, since noise signals also flow through the amplifier, the amount of noise component increases.

Such an arrangement in which noise is removed by one operation has a low rate of noise reduction, but also has advantages in that the circuit configuration and the driving mechanism are simplified and the speed of reading is increased.

Second Embodiment

A second embodiment of the present embodiment includes a mode for capturing a moving image and a mode for capturing a still image. An image capture device in the second embodiment has essentially the same configuration as the image capture device in the first embodiment shown in FIG. 1, but is different in applications and operations.

In the second embodiment, when a mode for capturing a moving image is selected, the same operation as in the first embodiment is performed, and when a mode for capturing a still image is selected, an operation described below is performed to capture a still image.

First, the FD sections 102 of all the pixels are reset and also the PD sections 101 of all the pixels are reset. After the reset is completed, an accumulation operation of electric charges (i.e., photoelectric conversion signals) generated in response to light incident on the PD sections 101 of all the pixels is started. Under the control of the CPU 62, a mechanical shutter, which is described below, is closed to thereby cause the charges to be stored for a predetermined amount of time. The mechanical shutter can be closed by adjusting a diaphragm 203, which is described below and shown in FIG. 12. The diaphragm 203 is, in turn, adjusted by the CPU 62, which is described below and shown in FIG. 12. When the mechanical shutter is open, during a period waiting to read from the FD sections 102, a certain percentage of light that enters the PD sections 101 leaks into the adjacent FD sections 102, thereby generating noise. The operation of closing the mechanical shutter prevents the generation of the leak noise. Thus, this arrangement can provide a low-noise, high-quality still image.

An operation after the mechanical shutter is closed will now be described with reference to FIG. 1. First, the selection gates (SEL) 106 in the first line shown in FIG. 1 are turned on, and then the FD sections 102 of the pixels in the first line are reset, so that reset signals are read out from the FD sections 102 to the corresponding capacitors 108. When the SELs 106 in the first line are in the "on" state, the transfer gates TX 103 in the first line are turned on. As a result, photoelectric conversion signals accumulated in the PD sections 101 are transferred to the corresponding FD amplifiers 105 and are also read out to the corresponding capacitors 109. The differential amplifier 123 removes a difference between the reset signals read out to the capacitors 108 and the signals read out to the capacitors 109. This processing can provide outputs (i.e., photoelectric conversion signals) that have no noise component resulting from FD amplifier variations and reset signal variations and that have an improved S/N ratio. After the reading of the first line is completed, in the same manner for the first line, signals are read out and noise is eliminated from photoelectric conversion signals until all the pixels in the second through last lines are completed.

Thereafter, the resulting signals are input to the computational processing circuit 60 shown in FIG. 4, and are subjected to the processing described below, rather than to the differential processing described in the first embodiment.

The mode for capturing a moving image and the mode for capturing a still image are controlled by the CPU (controlling section) 62, which is described below.

As described above, in the still-image mode, since the mechanical shutter can be used, photoelectric conversion signals in the PD sections 101 can be transferred to the corresponding FD sections 102 for each line. Thus, first, signals obtained by resetting the FD sections 102 are read out, and without the reset of the FD sections 102, the photoelectric conversion signals can be read out to the FD sections 102. As a result, the signals that are first read and the signals that are sequentially read contain the same reset voltage component. Thus, reseat voltage variations can be removed with high accuracy, compared to the moving mode.

That is, for the still-image mode, the above-described driving operation, which is different from the operation for the moving image mode, is performed to thereby make it possible to provide a high-quality still image.

As described above, the mode for capturing a moving image and the mode for capturing a still image are provided in the present embodiment. While this arrangement in the present embodiment cannot completely eliminate noise at the time of capturing a moving image, it can provide an image having no distortion and also can provide a high-quality still image from which noise has been completely eliminated. That is, according to the present embodiment, optimum signals are read depending on applications.

The mode for capturing a moving image and the mode for capturing a still image are generated by an image-capture controlling circuit (image-capture controlling section) included in a timing generator, which is described below. The mode for capturing a moving image and the mode for capturing a still image are switched in accordance with a control signal supplied from a selecting section included in the CPU 62, which is described below.

Third Embodiment

In the pixel area shown in FIG. 1, a time lag exists between the noise signals that result from an accumulation-time difference and that are first read and the noise signals that result from an accumulation-time difference and that are contained in the read photoelectric conversion signals. Thus, strictly speaking, it is impossible to completely eliminate noise resulting from an accumulation-time difference.

Figure 6:
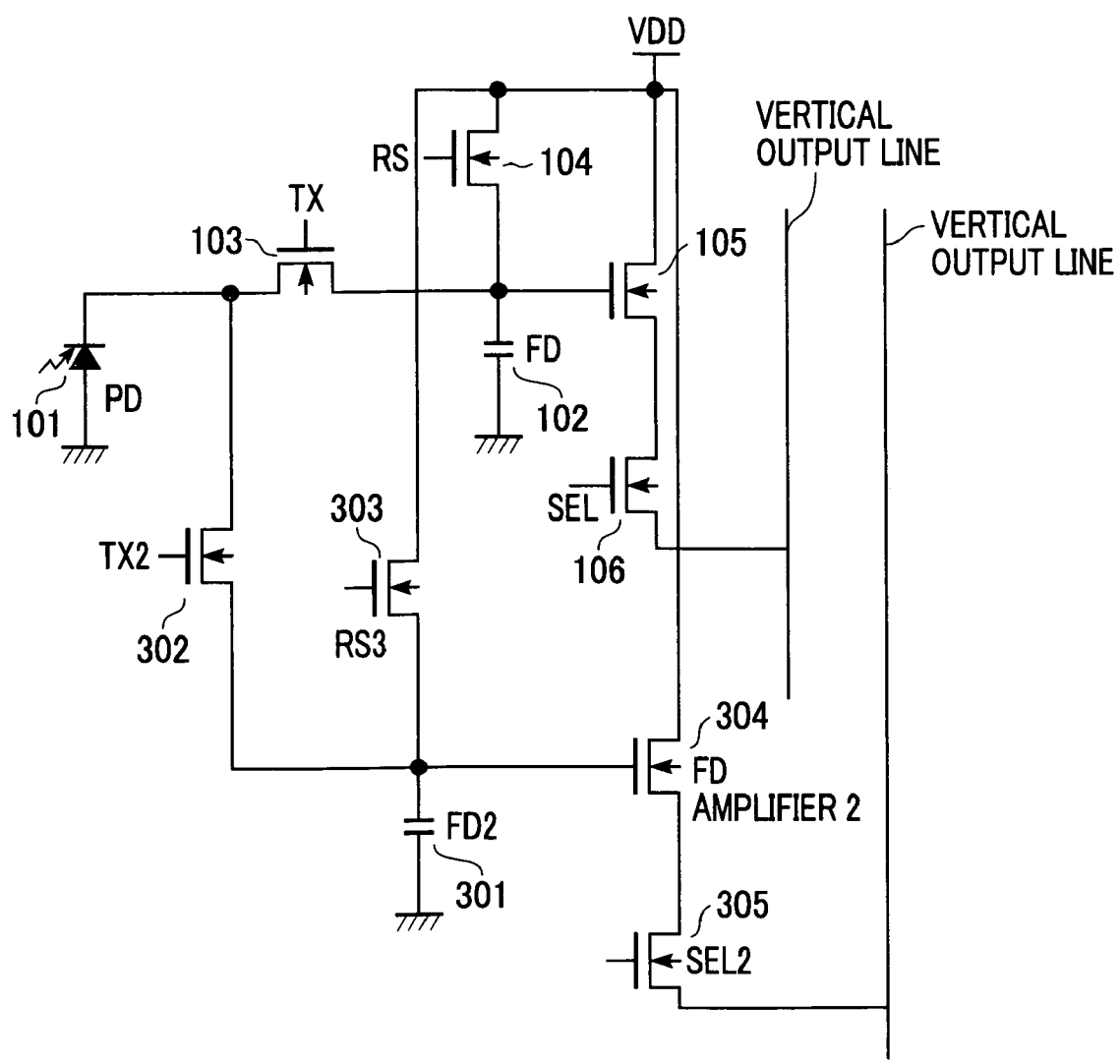
FIG. 6 is a circuit diagram of a circuit having two FD sections and two output lines.

However, providing two capacitors and two vertical output lines, as shown in FIG. 6, for each pixel allows for complete elimination of noise signals that result from an accumulation-time difference. Although the position of the SEL 106 shown in FIG. 6 is different from that shown in FIG. 1, the SEL 106 has the same function.

The operation of this configuration will now be described with reference to FIG. 6.

First, high pulses are applied to reset gates (RS) 104, reset gates (RS3) 303, transfer gates (TX) 103, and transfer gates (TX2) 302, so that the FD sections 102 and FD sections (FD2) 301 of all the pixels are reset at the same time, and also the PD sections 101 of all the pixels are reset at the same time. After the reset is completed, an accumulation operation of electric charges (i.e., photoelectric conversion signals) that are generated in response to light incident on the PD sections 101 of all the pixels is started. After photoelectric conversion signals are stored for a predetermined amount of time, high pulses are again applied to the reset gates (RS) 104, so that the FD sections 102 of all the pixels are reset at the same time, and, simultaneously, high pulses are applied to the transfer gates (TX2) 302. Consequently, the charges accumulated in the PD sections 101 of all the pixels are transferred to the FD sections (FD2) 301. After the high pulses go low, the charges transferred to the FD sections 102 are held. High pulses are applied to selection circuits (SEL) 106 and selection circuits (SEL2) 305, so that signals are read from the FD sections 102 and the FD sections (FD2) 301 to the corresponding vertical output lines. The individual pixel circuits configured as shown in FIG. 6 can output, in real time, noise generated in the read-out waiting time, thereby making it possible to completely eliminate noise signals resulting from an accumulation-time difference.

Fourth Embodiment

Figure 14:
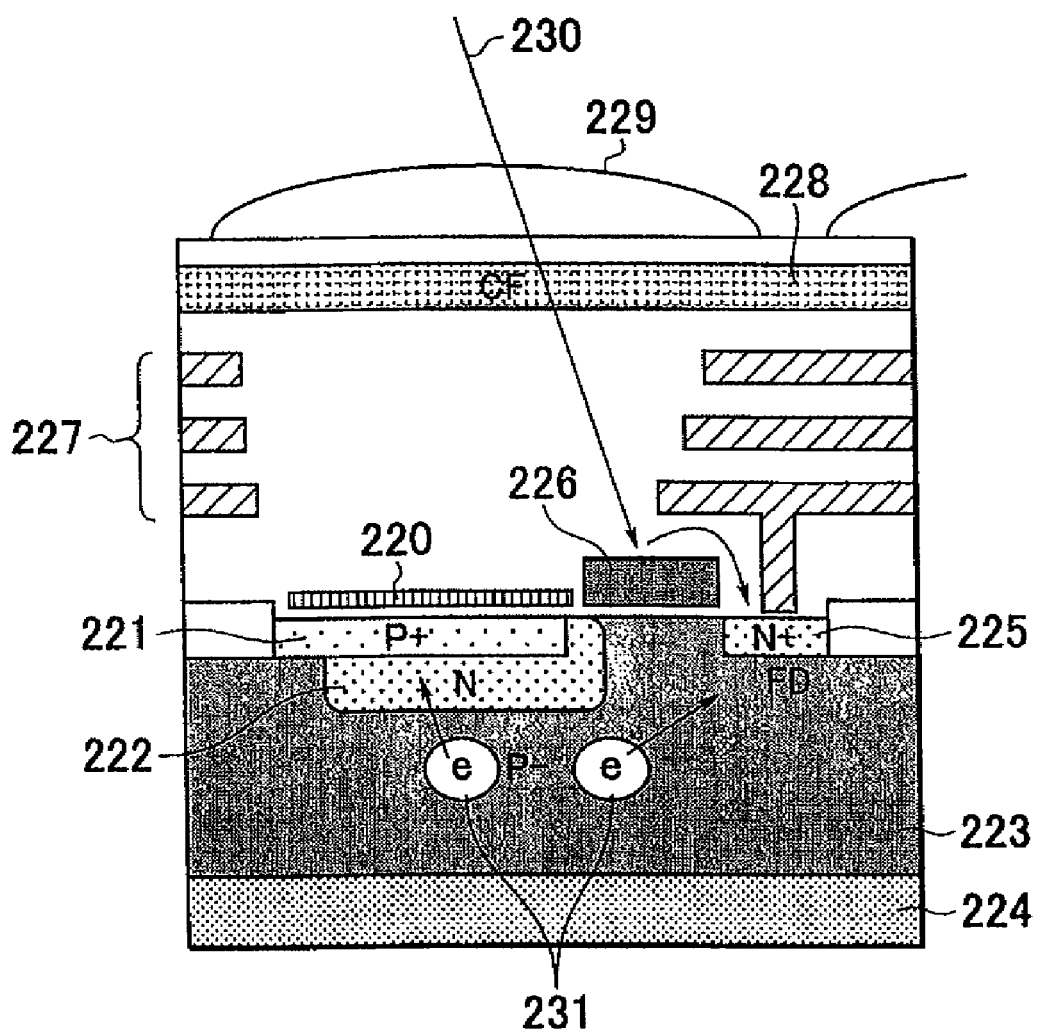
FIG. 14 is a sectional view showing the vicinity of a photodiode, i.e., a sensor, in the embodiments of the present invention and the known example.

In a fourth embodiment of the present embodiment, the image capture device shown in FIG. 1 is used and, as described in the first embodiment, photoelectric conversion signals generated in the PD sections 101 are simultaneously transferred to the FD sections 102 and then signals are sequentially read out for each row. Thereafter, a predetermined arithmetic expression is used to correct noise generated in the read-out waiting time. As described with reference to FIG. 14, a certain percentage of light that enters the PD sections 101 leak into the adjacent FD sections 102. As a result, the lower the row is in the screen, the larger the amount of image signal read from the image capture device, compared to the amount of signal obtained in intended accumulation time (i.e., in the PD sections 101).

An image signal read out from one row in the image capture device can be substantially expressed by q(Tint+K*Twait), where K indicates a sensitivity ratio coefficient that is the ratio of photoelectrically converting light incident on the FD sections 102 to light incident on the PD sections 101, Tint indicates the accumulation time of photoelectric conversion signals in the PD sections 101, Twait indicates the waiting time of photoelectric conversion signals in the FD sections 102, and q indicates the amount of photo charge generated in the FD sections per unit of time. In this case, however, since the accumulation time and the waiting time are sufficiently short, it is presumed that the amount of light that enters the pixels when photoelectric conversion signals are accumulated in the PD sections 101 is substantially the same as the amount of light that enters the pixels when the reading of photoelectric conversion signals in the FD sections 102 are waited for.

In this case, since q*K*Twait is noise generated in the read-out waiting time, multiplying an image signal read from the image capture device by Tint/(Tint+K*Twait), which is the ratio of photo charge generated only in the PD sections 101 to photo charge generated in the PD sections 101 and the FD sections 102, provides photo charge qTint that is generated in substantially only the PD sections 101 and that has a reduced amount of q*K*Twait component.

The sensitivity ratio coefficient K of the FD sections 102 to the PD sections 101 is affected by, for example, a luminous flux, and thus can be expressed with a table based on incident-light states, including lens pupil distance information, lens f-number information, and pixel positions in the image capture device.

In the relationship of the lens pupil distance information, when the lens pupil distance decreases, the angle of incident light increases toward an image edge, thereby causing no light to enter vertically, so that the amount of light that leaks into the FD sections 102 increases. In the relationship of lens f-number information, when the lens f-number decreases, the size of the pupil (i.e., a diaphragm or diaphragm ghost image viewed from the pixel side) increases and the angle of incident light-beam increases, thereby causing no light to enter vertically, so that the amount of light that leaks into the FD sections 102 increases.

To ensure that light rays do not vary depending on positions in the image capture device, micro lenses are generally arranged to be displaced in accordance with image heights (i.e., distances between optical axes and the pixels). If the variations are still significant, K is expressed with the table in accordance with pixel x-y coordinates.

Before shipment of a camera, sensitivity ratio coefficient K1 for lens pupil distance d1, lens f-number F1, and pixel x-y coordinates (x1, y1), and sensitivity ratio coefficient K2 for lens pupil distance d2, lens f-number F2, and pixel x-y coordinates (x2, y2) are determined for the table and the table is stored in the camera.

The sensitivity ratio coefficient is set to be larger as the lens pupil distance is larger and the position is closer to an edge of the image capture device. The sensitivity ratio coefficient is also set to be smaller as the lens f-number increases.

At the time of actually taking an image, the use of the table can provide an image signal having a smaller amount of noise.

During manufacture of a camera, the table for the sensitivity ratio coefficient K is created in accordance with lens pupil distance information, lens f-number information, and pixel position information. Alternatively, the table may be created in accordance with lens pupil distance information and pixel position information (e.g., the lens is fixed), lens f-number information and pixel position information (e.g., the diaphragm is fixed), or only pixel position information (e.g., the lens and the diaphragm are fixed). The table for the sensitivity ratio coefficient K may be pre-set to have a fixed value that does not allow for the angle of incident light.

The image capture device in the fourth embodiment has the same configuration as that in the first embodiment shown in FIG. 1. An operation for actually taking an image will now be described with reference to FIGS. 1 and 3. At time T21, high pulses are applied to terminals 19 and 21, so that the FD sections 102 of all the pixels are reset at the same time, and the PD sections 101 of all the pixels are reset at the same time. After the reset is completed, an accumulation operation of electric charges (i.e., photoelectric conversion signals) that are generated in response to light incident on the PD sections 101 of all the pixels is started. After the photoelectric conversion signals are stored for a predetermined amount of time, at time T22, a high pulse is applied to terminal 21 again, so that the FD sections 102 of all the pixels are reset at the same time. Thereafter, at time T23, a high pulse is applied to terminal 19 again, so that the charges stored in the PD sections 101 of all the pixels are transferred to the corresponding FD sections 102 at the same time. After the high pulse goes low, the charges transferred to the FD sections 102 are held. At time T24, a vertical-scan start pulse is input to terminal 2 and a vertical-scan pulse is input to terminal 3, so that the first row is selected and the signal 20a (which is not shown in FIG. 3) goes high. Also, at time T24, high pulses are applied to terminals 11, 12, and 13, so that the capacitors 108 and 109 are reset. At time T25, high pulses are applied to terminals 10 and 12, so that signals, corresponding to photoelectric-conversion signal voltages, noise-signal voltages due to an accumulation-time difference, and reset signal voltages, are read out from the FD sections 102 to the corresponding capacitors 108. At time T26, high pulses are applied to terminals 8 and 11, so that the FD sections 102 and the capacitors 109 are reset. At time T27, high pulses are applied to terminals 10 and 13, so that signals corresponding to the reset voltages across the FD sections 102 are read out to the corresponding capacitors 109. At time T28, the voltage at terminal 14 changes from high to low, so that the horizontal output lines 119 and 120 are reset. At the same time, a horizontal-scan start pulse is input to terminal 5 and a horizontal-scan pulse is input to terminal 6, so that signal reading from the line memory, which is constituted by the capacitors 108 and 109 in the individual columns, is started. The level of the signal input to the terminal 14 is operated with a phase opposite to that of the horizontal scan pulse so as to prevent the interference of the capacitors 108 and 109 in the individual columns. The differential amplifier 123 removes a difference between both the outputs, and can provide signal voltages that do not contain reset voltage variations and FD amplifier variations which differ depending on the pixels. Thus, the operation in fourth embodiment can provide signals that do not contain noise components resulting from FD amplifier variations and reset voltage variations and that have an improved S/N ratio. The operation for the first line in the period from time T24 to time T31 is sequentially performed, after time T31, for all the rows after the second line, until reading of all the rows is completed.

According to the operation described above, after the FD sections 102 of all the pixels are reset, photoelectric conversion signals are transferred from the PD sections 101 to the FD sections 102 at the same time, and then signals are sequentially read out for each line. Thus, signals read from the pixels in the lower lines have a larger amount of noise-signal voltage component that results from an accumulation-time difference.

That is, noise signal voltages (the signal 57 generated in the read-out time, as shown in FIG. 5) that have a different signal level for each line and that result from an accumulation-time difference and voltages (the photoelectric conversion signal 56 as shown in FIG. 5) corresponding to photoelectric conversion signals generated in the PD sections 101 are output.

The timing pulses described above and shown in FIG. 3 are generated by an image-capture controlling circuit (an image-capture controlling section) included in a timing generator (FIG. 12) described below. Signals output from the image capture device are subjected to software-based correction processing by the CPU 62 (a correcting section described below and shown in FIG. 12).

Figure 7:
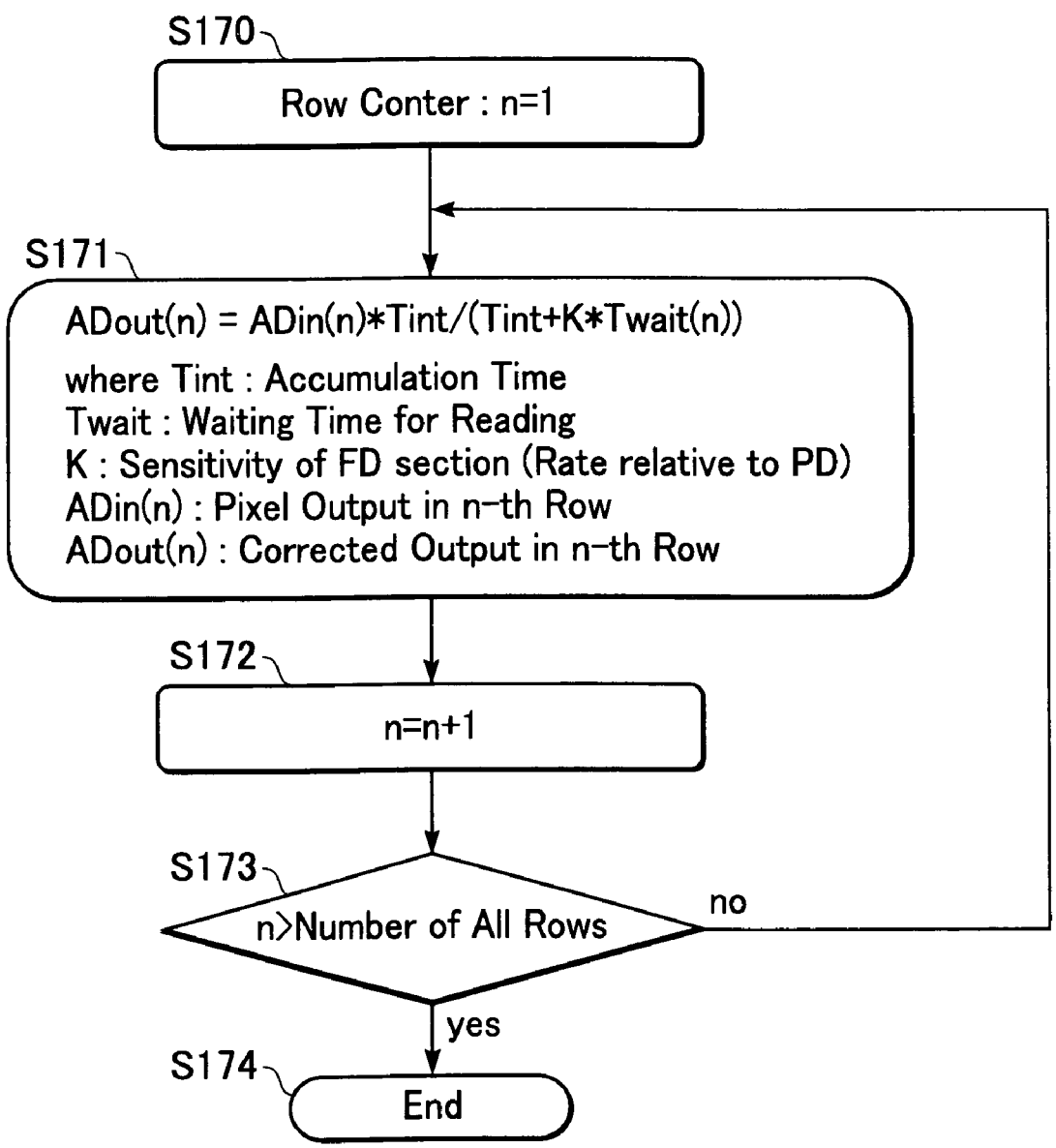
FIG. 7 is a flow chart illustrating a flow for software-based correction of an image in the fourth embodiment of the present invention.

An image signal correction executed by the CPU 62 in the fourth embodiment of the present invention will now be described with reference to a flow chart shown in FIG. 7. This processing is implemented by software.

In step S170, a row counter is set to the first row. Next, the CPU 62 performs the computations shown in step S171.

Since row-scanning is employed in this case, when the row number is represented by n, correction can be achieved by multiplying original image data ADin(n) by a correction signal Tint/(Tint+K*Twait(n)), which is the ratio of amount of signal stored in the FD sections 102 to the amount of signal stored in both the FD sections 102 and the FD sections 102, where Twait(n) indicates the waiting time of optical conversion signals in the FD sections 102 in the pixels in the n-th line.

In step S172, the line counter is advanced to the next row. In step S173, a determination is made whether all of the lines have been completed. If all the lines have not been completed, the processes in steps 171 and 172 are repeated. When all the lines have been completed, the process ends in step S174.

In this manner, the fourth embodiment can extract pure accumulation signals from noise-containing accumulation signals without directly determining noise signals. This not only reduces the read-out time, but simplifies the configuration of the apparatus.

Fifth Embodiment

The configuration of an image capture device in a fifth embodiment and the operation of reading signals therefrom are the same as those in the fourth embodiment. FIG. 8 shows the operational flow of a computational processing circuit in the fifth embodiment of the present invention. This operation is implemented by hardware. Reference numeral 60 indicates a computational processing circuit 60 serving as a main computing module. Signals output from the image capture device are subjected to correction processing by the computational processing circuit 60 (correcting section) shown in FIG. 8. Reference numeral 161 indicates coefficient Twait0, which represents horizontal scan time for one row. That is, Twait0 represents a time difference in selection from one row to the next. Reference numeral 162 denotes row counter n. Twait0 is multiplied by the value of row counter by a multiplier 163 to thereby provide waiting time Twait(n) for each row, and the result is sent to the computational processing circuit 60. Reference numeral 164 indicates a sensitivity ratio coefficient K and 165 denotes an accumulation time register Tint. K is generally affected by light rays, and thus can be expressed with a table based on lens pupil distance information 166 and lens f-number information 167. To ensure that light rays do not vary depending on positions in the image capture device, micro lenses are generally arranged to be displaced in accordance with image heights (i.e., distances between optical axes and the pixels). If the variations are still significant, K is expressed with the table in accordance with pixel x-y coordinates 168.

That is, the computational processing circuit 60 has the table containing incident-light states, for example, lens pupil distance information, lens f-number information, and pixel positions, as in the fourth embodiment.

Multiplying the signal (i.e., input data ADin) that has been output from the pixels by the correction signal Tint/(Tint+K*Twait(n)) provides a corrected signal ADout. As a result of the correction processing, a uniform level of ADout is ensured at any position on the screen.

Sixth Embodiment

A sixth embodiment of the present invention will now be described with reference to a sequence diagram shown in FIG. 9.

Although gain correction dealing only with leak-light components have been described above, fixed pattern noise that cannot be eliminated by the above-described S-n circuit exists in practice.

Major causes of the fixed pattern noise are "cancel remainder of FD amplifier variations", "dark current in the PD sections in the pixels", and "dark current variations in the FD sections 102". For a moving image, however, since the accumulation time is also short, the fixed pattern noise is not a significant factor. In contrast, waiting time until "dark current in the FD sections 102" is read differs depending on a position within the screen, and a longer one can exceed 10 ms. While the PD sections 101 have provision for reducing dark current with the buried photodiodes, the FD sections 102 are exposed at a chip surface, and thus the amount of dark current in the FD sections 102 is orders of magnitude larger. Accordingly, dark correction (i.e., "black compensation"), which deals with dark current in the FD sections 102, is considerably effective.

Figure 9:
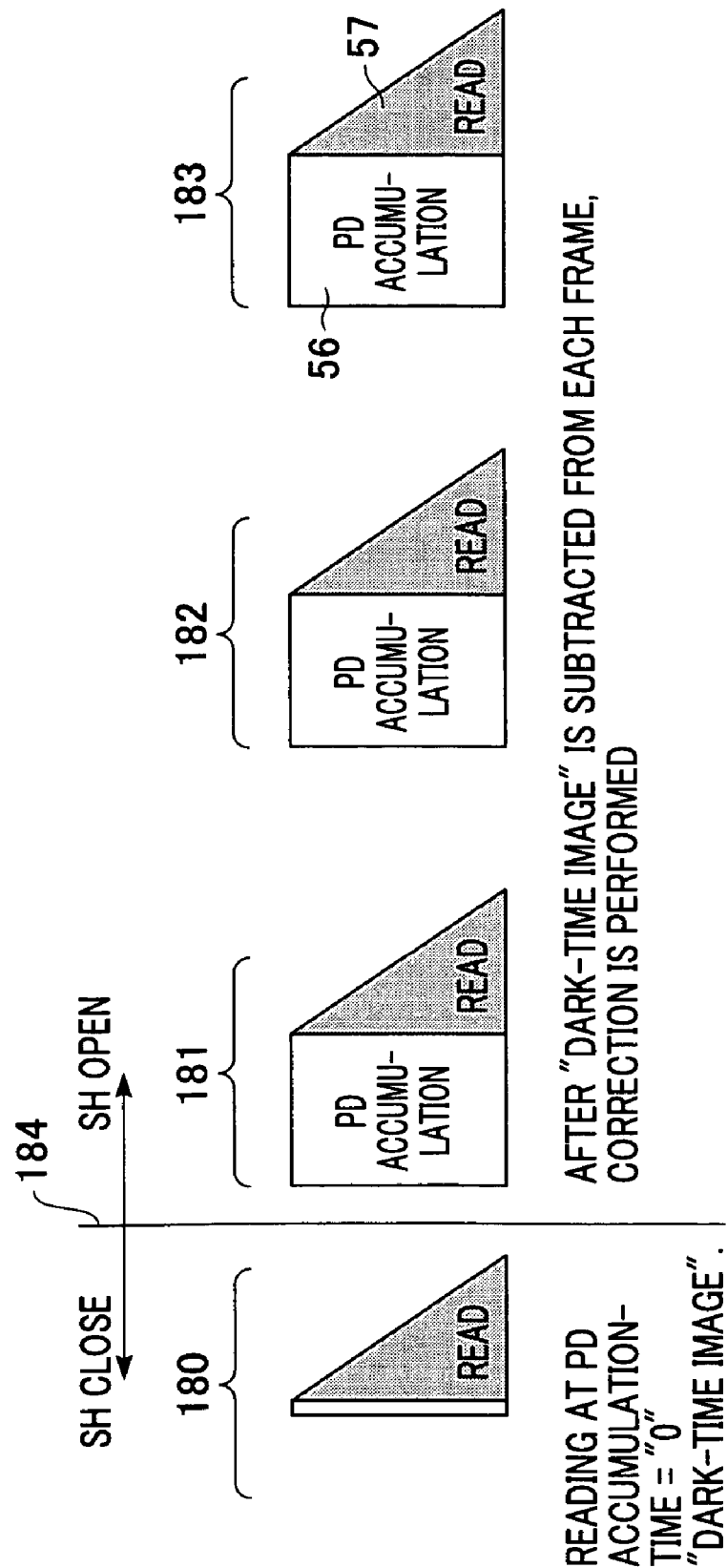
FIG. 9 shows a sequence of dark correction (black compensation) in a sixth embodiment of the present invention.

Reference numeral 184 in FIG. 9 indicates a time boundary between before and after an image is taken. Before time 184, the mechanical shutter (SH) disposed in front of the image capture device is closed, and after time 184, the shutter is opened so that moving images are continuously captured.

Reference numeral 180 indicates an accumulation when the mechanical shutter is closed. In this case, accumulation time in the PD sections is substantially zero and reading from the FD sections takes the same amount of time used for a sequence in a typical electronic-shutter moving-picture mode. As a result, an image obtained from the accumulation 180 includes the above-noted "cancel remainder of FD amplifier variations" and also includes "dark current variations in the FD sections" corresponding to the waiting time for each row. This image will be referred to as a "dark-time image".

At time 184, when the mechanical shutter is opened, reading of moving images shifts in the order of 181, 182, and 183. Subtracting the "dark-time image", which is obtained from the accumulation 180, from the respective moving images obtained from 181, 182, and 183 makes it possible to substantially cancel fixed pattern noise contained in the moving images.

On the basis of the resulting images, performing the gain correction described in the first and second embodiments can ensure the correction of both the signal level and the gain, thereby allowing reproduction of moving images faithful to a subject.

With this system, once the "dark-time image" is sampled before a moving image is taken, the temperature does not change much in the subsequent moving-image taking and thus dark current also does not increase, so that the dark-time image can be reused during the same series. Thus, as indicated by 181 to 183, immediately after reading for one frame is finished, the operation can be shifted to the accumulation for the next frame, thereby eliminating waste of time. Further, the subtraction of the "dark-time image" can be performed in parallel with the reading operation and can also be processed during accumulation for the next frame.

Accordingly, this correction system, as well as the above-described gain correction for dealing with light leak, is suitable for sequential processing for taking moving images.

As described above, in the fourth to sixth embodiments, the CPU is provided to correct the correction signal in accordance with incident light states, such as lens pupil distance information, lens f-number information, and pixel positions. Further, in accordance with the correction signal, the CPU corrects noise components that are contained in image signals having different waiting time, in which the image signals are held, and that are produced due to the difference in the waiting time. As a result, the embodiments described above can ensure a uniform output level at any position of the screen.

Seventh Embodiment

A seventh embodiment of the present embodiment will now be described with reference to FIGS. 10 and 11.

The pixel area shown in FIG. 1 has been described in conjunction with four-transistor type pixels. In the configuration shown in FIG. 1, however, in order to cause the PD sections 101 to be reset, the TXs 103 and the RSs 104 are turned on at the same time. Thus, when the PD sections 101 are to be reset, the FD sections 102 need to be reset together.

That is, after the FD sections 102 of all the pixels are reset, while signals are sequentially being read from the FD amplifiers 105 for each line, the PD sections 101 need to continue the photoelectric conversion operation.

In other words, it is impossible to arbitrarily set accumulation time for the PD sections 101.

Thus, in the first and fourth embodiments, as shown in FIG. 5, accumulation time for the PD sections 101 is provided independently from read-out time for only the FD sections 102. However, as shown in FIG. 11, reading signals from only the FD sections 102 during accumulation time for the PD sections 101 allows the frame rate to be increased.

Reference numeral 74 in FIG. 11 indicates a time boundary between before and after an image is taken. Before time 74, the mechanical shutter (SH) disposed in front of the image capture device is closed, and after time 74, the shutter is opened so that moving images are continuously taken.

Reference numeral 70 indicates a state in which signals corresponding to reset voltages after the FD sections 102 of all the pixels are reset are sequentially read from the FD amplifiers 105 for each line without the transfer from the PD sections 101. Reading from the FD sections 102 takes the same amount of time used for a sequence in a typical electronic-shutter moving-picture mode. As a result, signals obtained from the accumulation 70 include noise signals that have been photoelectrically converted in accordance with waiting time for each row and the photoelectric conversion sensitivity of the FD sections 102.

At time 74, when the mechanical shutter is opened, reading of moving images in the order of accumulations 71, 72, and 73 is started and also reading of moving images in the order or accumulations 70, 75, and 76 that result from only the photoelectric conversion sensitivity of the FD sections 102 is started. Subtracting the images that are obtained from the accumulations 70, 75, and 76 from the corresponding images that are obtained immediately thereafter from the accumulations 71, 72, and 73 makes it possible to substantially cancel fixed pattern noise and components that are contained in the moving images and that result from the photoelectric conversion sensitivity of the FD sections 102, in the same manner as the first and fourth embodiments.

With this approach, however, it is still impossible to reduce the read-out time for the FD sections 102. Accordingly, as shown in FIG. 10, in each pixel, a reset gate RS2 (resetting portion) 124 is provided separately from the reset gate 104 in order to allow the PD section 101 to be reset independently of the FD section 102. Although the position of the SEL 106 is different from that shown in FIG. 1, the SEL 106 has the same function.

In this manner, the reset gates RS 104 for resetting the FD sections 102 and the reset gates RS2 124 for resetting the PD sections 101 are separately provided. As a result, after the FD sections 102 of all the pixels are reset at the same time, while the resulting signals are being sequentially read from the FD amplifiers 105 for each line, the PD sections 101 can be reset.

In this case, the reset gates RS2 124 and the transfer gates TX 103 can be used for the front curtain and the rear curtain, respectively, of the shutter. Thus, charges can be accumulated in the PD sections 101 in parallel with the waiting time in which signals are read from only the FD sections 102 That is, the frame rate of a sequence of moving images read out from the FD sections 102 of each line is defined by double the amount of read-out time, thereby making it possible to provide a moving-image capture system having a high frame rate.

As described in the first embodiment, both the differential processing by the differential amplifier 123 and the differential processing by the computational processing circuit 60 may also be performed in the present embodiment. Also, the operations at time T04, T05, T26, and T27 shown in FIGS. 2 and 3 do not have to be performed. Further, the differential amplifier 123 and the paths (111, 109, 116, 120, 118, and 114) for reading out reset signals during the operations at time T04, T05, T26, and T27 may be eliminated.

Although examples in which the pixels are arranged in a matrix and reading is sequentially performed for each line in have been provided in the descriptions for the first and second embodiments, the arrangement may be such that the pixels are arranged in one line and reading is sequentially performed for each pixel by a line sensor.

In the first and second embodiments, the time when noise signals are detected varies between signals that are held in the pixels for a different amount of time and signals that contain photoelectric conversion signals and that are held in the pixels for a different amount of time. However, since the amount of signal that is held in the pixels for a different amount of time is smaller than the amount of photoelectric conversion signal, noise can be sufficiently corrected.

In the first and second embodiments, although noise signals that are generated due to a difference in time in which signals are held in the pixels are read out from the pixels, signals corresponding to noise signals generated due to a difference in time in which signals are held in the pixels may be pre-stored in the first storing portion.

Figure 10:
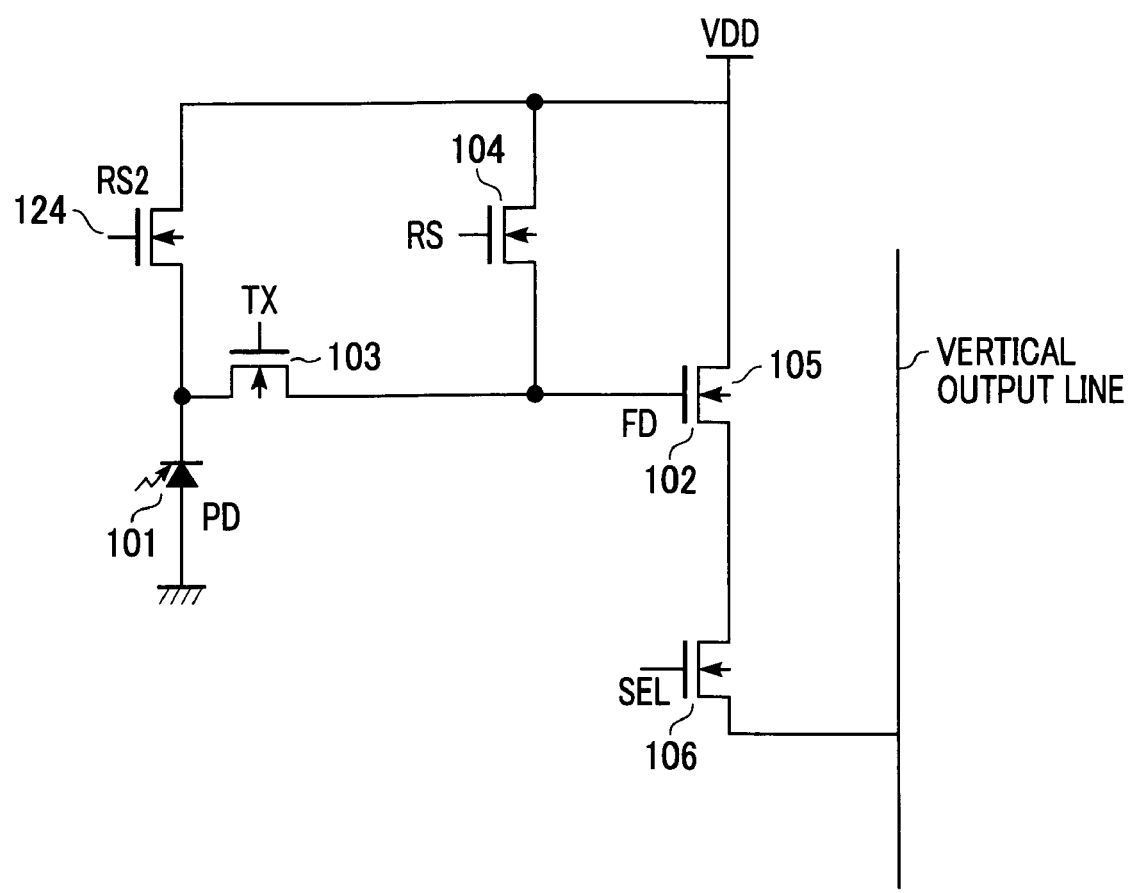
FIG. 10 is a circuit diagram of a five-transistor type pixel in the present invention.

In the fourth to sixth embodiments, the reset gate RS2 124 may be provided for each pixel, as shown in FIG. 10, to allow the PD section 101 to be reset independently of the FD section 102. This allows for the next accumulation in parallel with read-out waiting time. In such a case, limiting the maximum amount of time for the accumulation of the PD sections 101 to the read-out time allows the accumulation of the PD sections 101 in the background of the reading. Thus, the frame rate of moving images is defined only by the read-out time, thereby making it possible to provide a moving-image capture system having a high frame rate.

As described above, in the first to seventh embodiments, the correcting section is provided to correct the correction signal in accordance with the waiting time in the FD sections serving as holding sections. Further, in accordance with the correction signal, the correcting section corrects noise components that are contained in image signals having different waiting time in which the image signals are held and that are produced due to the difference in the waiting time. As a result, the embodiments described above can ensure a uniform output level at any position of the screen.

In the first to third embodiments, noise signals that provide a correction signal and that correspond to the waiting time in the FD sections 102 are read out from the image capture device, and then images signals are read out from the image capture device. The noise signals that differ for each line and the image signals are subjected to differential processing performed by a timing generator and a computational processing circuit which serve as a correcting section.

In the fourth to sixth embodiments, the CPU (correcting section) 62 changes the correction signal, i.e., Tint/(Tint+ K*Twait(n)), in accordance with the waiting time (Twait(n)) in the FD sections 102 and multiplies image signals sent from the image capture device by the correction signal.

Eighth Embodiment

The operations of the image capture device and the image capture apparatus described in the first to seventh embodiments will now be described with reference to FIG. 12.

Figure 12:
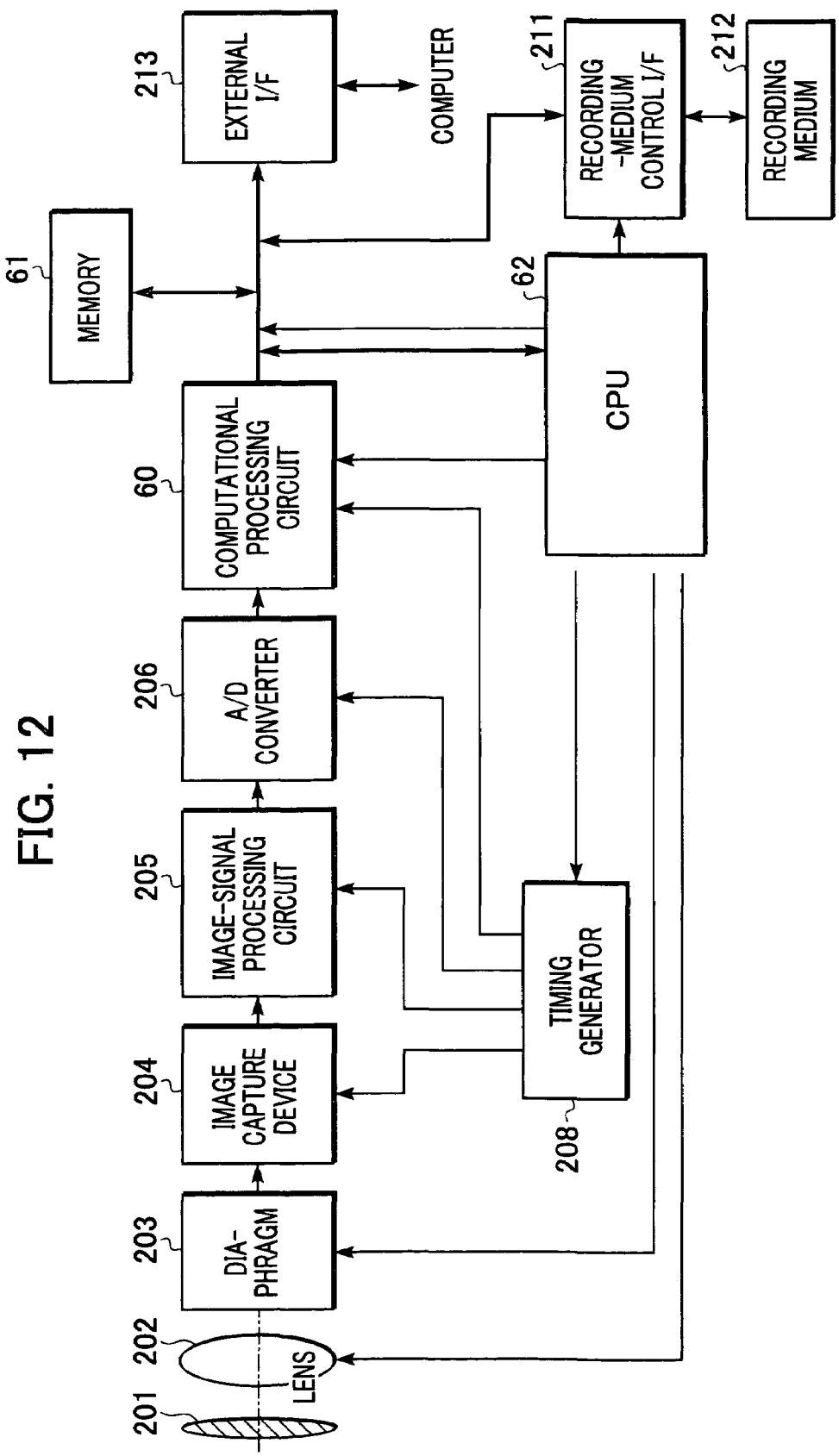
FIG. 12 is a block diagram of an image capture apparatus.
Figure 13:
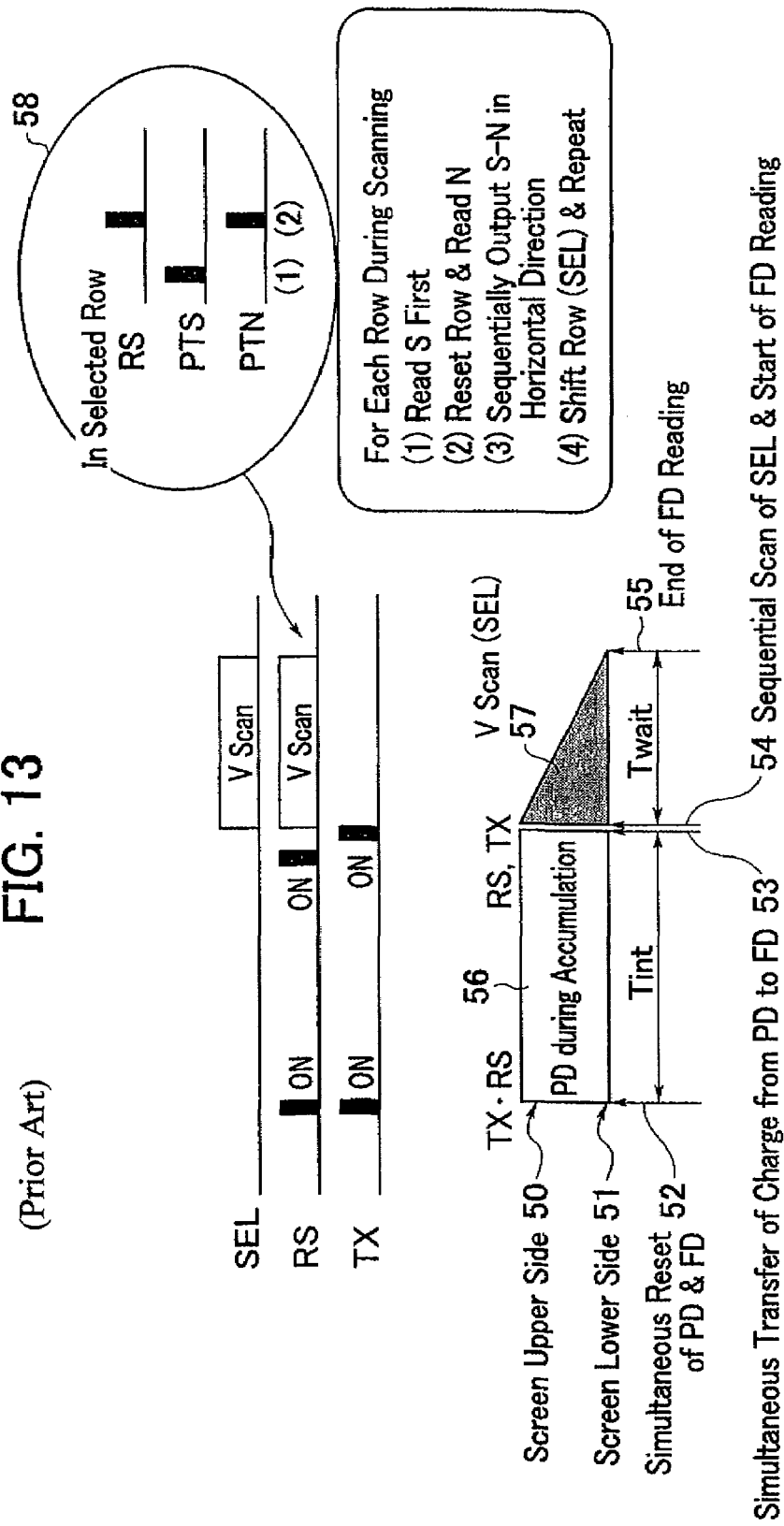
FIG. 13 is a timing chart illustrating an operation of taking a moving image according to a known example.

Referring to FIG. 12, a barrier 201 serves as both a main switch and a protector for a lens 202, which forms an optical image of a subject on an image capture device 204. A diaphragm 203 varies the amount of light that has passed through the lens 202. An image capture device 204 captures the subject's image formed by the lens 202 and outputs image signals. An image-signal processing circuit 205 includes, for example, a variable gain amplifier section for amplifying the image signals output from the image capture device 204 and a gain correction circuit section for correcting a gain. An analog-to-digital (A/D) converter 206 performs A/D conversion on the image signals output from the image capture device 204. A computational processing circuit 60 performs various types of correction on image data output from the A/D converter 206 and compresses the image data. A timing generator 208 outputs various timing signals to the image capture device 204, the image-signal processing circuit 205, the A/D converter 206, and the computational processing circuit 60 to control the image capture and the correction. A central processing unit (CPU) 62 performs various computations and controls the entire image capture apparatus. A memory section (first storing section) 61 temporarily stores image data. An interface (I/F) unit 211 records/reads image data to/from a recording medium (second storing section) 212. The recording medium 212 may be a detachable recording medium, including a semiconductor memory. An interface (I/F) unit 213 is used for communication with an external computer or the like.

First, a description is given of the operation of the image capture apparatus, which has the above-described configuration, at the time of capturing a still image. When the barrier 201 is opened, a main power supply is turned on. In turn, a control-system power supply is turned on, and further, image-capture-system circuits, such as the A/D converter 206, are powered on.

Thereafter, in order to control the amount of exposure, the CPU 62 causes the diaphragm 203 to open, so that signals are output from the image capture device 204. The signals are then converted into digital signals by the A/D converter 206 and the resulting signals are input to the computational processing circuit 60.

In accordance with data output from the computational processing circuit 60, the CPU 62 computes the exposure. In accordance with the result of the photometric measurement, the CPU 62 determines the brightness and controls the diaphragm 203.

Based on the signals sent from the image capture device 204, the CPU 62 extracts high-frequency components and computes a distance to the subject. Thereafter, the CPU 62 drives the lens 202 and determines whether or not the lens 202 is focused on the subject. When it is determined that the lens 202 is out of focus, the CPU 62 drives the lens 202 again and measures the distance.

After the focusing is confirmed, a main exposure is started. A still image is captured in accordance with the operation described in the second embodiment. Thereafter, data is stored in the memory section 61. Under the control of the CPU 62, the data is recorded in the detachable recording medium 212, such as a semiconductor memory, via the recording-medium control I/F unit 211. Alternatively, the data may be directly transferred to a computer or the like via the external I/F unit 213 for image processing.

Next, a description is given of the operation of the image capture apparatus, which has the above-described configuration, at the time of capturing a moving image. When the barrier 201 is opened, a main power supply is turned on. In turn, a control-system power supply is turned on, and further, image-capture-system circuits, such as the A/D converter 206, are powered on.

Photoelectric conversion signals corrected at the time of capturing a moving image are output in the following two ways.

In the first way, the CPU 62 causes the diaphragm 203 to open, so that noise signals are read out from the FD sections 102 with the same amount of time as that for reading out photoelectric conversion signals, the noise signals having different waiting times in the FD sections 102 for the individual pixels. The noise signals are then output from the image capture device 204. The output noise signals are converted by the A/D converter 206 and are then stored in the memory section 61 by the CPU 62. Thereafter, photoelectric conversion signals that were accumulated in the PD sections 101 and have been transferred to the FD sections 102 and that have different waiting times in the FD sections 102 for the individual pixels are output from the image capture device 204. The output photoelectric conversion signals are converted by the A/D converter 206 and the resulting photoelectric conversion signals are input to the computational processing circuit 60. In parallel, the above-noted noise signals are input to the computational processing circuit 60. In the computational processing circuit 60, the noise signals are subtracted from the photoelectric conversion signals, so that the photoelectric conversion signals are corrected. Thereafter, the corrected photoelectric conversion signals are stored in the memory section 61 by the CPU 62.

In the second way, the CPU 62 causes the diaphragm 203 to open, so that photoelectric conversion signals are stored in the PD sections 101, are transferred to the FD sections 102, and are held for a different amount of time for each pixel. Then the photoelectric conversion signals are output from the image capture device 204. The output photoelectric conversion signals are converted by the A/D converter 206 and are input to the computational processing circuit 60. In the computational processing circuit 60, the photoelectric conversion signals are converted in accordance with the correction signal described in the fourth and fifth embodiments. Thereafter, under the control of the CPU 62, the corrected photoelectric-conversion signals are stored in the memory section 61.

In accordance with the data of the corrected photoelectric-conversion signals that are output in either of the two ways described above and that are stored in the memory section 61, the exposure is computed by the CPU 62. In accordance with the result of the exposure computation, the CPU 62 determines the brightness. Further, in accordance with the result of the determination, the CPU 62 controls the amount of exposure for capturing images of the next screen. In parallel, based on the signals output from the image capture device 204, the CPU 62 extracts high-frequency components and computes a distance to the subject. In accordance with the result of the computation, the CPU 62 drives the lens 202 for capturing the images of the next screen.

Under the control of the CPU 62, the data stored in the memory section 61 is recorded in the detachable recording medium 212, such as a semiconductor memory, via the recording-medium control I/F unit 211. After the focusing is confirmed, the exposure control for the next screen is resumed.

The corrected photoelectric-conversion signals are then output in either of the two ways described above and the resulting data is stored in the memory section 61 by the CPU 62.

In accordance with the data, exposure computation for controlling the diaphragm 203 for the next screen and photometric measurement for driving the lens 202 are performed by the CPU 62. Thereafter, under the control of the CPU 62, the data stored in the memory section 61 is recorded in the detachable recording medium 212, such as a semiconductor memory, via the recording-medium control I/F unit 211. Alternatively, the data may be directly transferred to a computer or the like via the external I/F unit 213 for image processing. In this manner, for capturing a moving image, the exposure adjustment and the lens driving adjustment are controlled in accordance with the signals of the previous screen. The above operation is repeated. Thus, the image capture apparatus having the configuration illustrated in FIG. 12 can obtain a high-quality image.

As described in the first embodiment, control may be performed such that noise is eliminated in the image capture device, is read out therefrom, and is then subjected to the noise elimination as described in the present invention. Although the description in the present embodiment has been given of the cases for capturing a still image and a moving image, the image capture apparatus may be applied to only a case for capturing a moving image.

The present invention is not limited to the above embodiments and various changes and modifications can be made within the spirit and scope of the present invention. Therefore to apprise the public of the scope of the present invention, the following claims are made.

What is claimed is:

1. An image capture apparatus comprising:
   first and second pixels, each having a sensor and a reading portion for reading out a signal from the sensor to an output line; and
   a correcting section for changing a correction signal in accordance with a waiting time in which signals from the first and second pixels are held, and for correcting noise components contained in image signals output from the first and second pixels in accordance with the correction signal, wherein waiting times in which the image signals are held in the first and second pixels being different from each other and wherein the noise components are generated due to the different waiting times.

2. The image capture apparatus according to claim 1, wherein the waiting times are determined at the time of image-taking.

3. An image capture apparatus according to claim 1 further comprising an image capture section that includes the first and second pixels, an image-taking lens for forming an image on the image capture section, an analog-to-digital converter for performing analog-to-digital conversion on a signal output from the image capture section and transferring the converted signal to the correcting section, a memory section for storing a signal output from the correcting section, and a storage controlling section for controlling the storage.

4. An image capture apparatus comprising:
first and second pixels, each having a sensor and a reading portion for reading out a signal from the sensor to an output line;
a memory for pre-storing noise information resulting from a difference in time in which the signals are held in the first and second pixel;
a calculator which calculates a second signal for correcting noise signals that result from a difference in time in which signals are held in the first and second pixels, based on the noise information stored in the memory; and
a correcting section for correcting, based on the second signal, first signals containing photoelectric conversion signals that are photoelectrically converted by the sensor for a predetermined amount of time, that are read from the reading portions, and that are held in the pixels for a different amount of time.

5. An image capture apparatus according to claim 4 further comprising an image capture section that includes the first and second pixels, an image-taking lens for forming an image on the image capture section, an analog-to-digital converter for performing analog-to-digital conversion on a signal output from the image capture section and transferring the converted signal to the correcting section, a memory section for storing a signal output from the correcting section, and a storage controlling section for controlling the storage.

6. An image capture apparatus comprising:
first and second pixels, each having a sensor;
a holding portion for holding the signal from the sensor;
a reading portion for reading out the signal held in the holding portion to an output line; and
a correcting section for changing a correction signal in accordance with a state of light entering the first and second pixels, and for correcting, in accordance with the correction signal, noise components that are contained in image signals output from the first and second pixels, wherein waiting times in which the image signals are held in the first and second pixels being different from each other and wherein the noise signals are generated due to the different waiting times.

7. The image capture apparatus according to claim 6, wherein the state of light is an angle of incident light.

8. An image capture apparatus comprising:
first and second pixels, each having a sensor;
a reading portion for reading out a signal from the sensor to an output line;
an image-capture controlling section for controlling first and second modes, wherein, in the first mode, noise information that results from a difference in time in which signals are held in the first and second pixels is detected, and, in the second mode, photoelectric conversion signals are accumulated in the sensors of the first and second pixels for a predetermined amount of time and second signals containing the photoelectric conversion signals are read out from the reading portions of the first and second pixels, the second signals being held in the pixels for a different amount of time; and
a correcting section for correcting the second signals, based on the noise information detected in the first mode.

9. The image capture apparatus according to claim 8, wherein each of the first and second pixels has a first reset switching portion for resetting the corresponding sensor and a second reset switching portion for resetting the corresponding holding portion, the sensors being reset in a period when the signals from the sensors are read from the holding sections.

10. An image capture apparatus according to claim 8 further comprising an image capture section that includes the first and second pixels, an image-taking lens for forming an image on the image capture section, an analog-to-digital converter for performing analog-to-digital conversion on a signal output from the image capture section and transferring the converted signal to the correcting section, a memory section for storing a signal output from the correcting section, and a storage controlling section for controlling the storage.

11. An image capture apparatus comprising:
first and second pixels, each having a sensor;
a holding portion for holding a signal from the sensor;
a reading portion for reading out the signal held in the holding portion to an output line;
an image-capture controlling section for controlling:
a first mode in which a first operation is performed to reset the sensors of the first and second pixels at the same time, to accumulate photoelectric conversion signals in the sensors for a predetermined amount of time, to reset the holding portion of the first pixel to provide a first signal, to read out the first signal from the reading portion of the first pixel, to supply the photoelectric conversion signal accumulated in the sensor of the first pixel to the corresponding holding portion, and to read out a second signal that contains the photoelectric conversion signal from the corresponding reading portion, a second operation is performed to read out a first signal that is obtained by the resetting the holding portion of the second pixel from the reading portion of the second pixel, to supply the photoelectric conversion signal accumulated in the sensor of the second pixel to the corresponding holding portion, and to read out a second signal that contains the photoelectric conversion from the corresponding reading portion;
a second mode in which an operation is performed to correct the read second signals based on the read first signals;
a third mode in which an operation is performed to reset the holding portions of the first and second pixels at the same time and to read out third signals, corresponding to time from the resetting until sequential signal-reading, from the reading portions of the first and second pixels;
a fourth mode in which an operation is performed to supply the photoelectric conversion signals accumulated in the sensors of the first and second pixels for a predetermined amount of time to the corresponding holding portions at the same time and to supply fourth signals, corresponding to time from when the photoelectric conversion signals are supplied to the holding portions until the photoelectric conversion signals are read out, from the reading portions of the first and second pixels;

a correcting section for performing a fifth mode in which the fourth signals read out in the fourth mode are corrected in accordance with the third signals read out in the third mode; and a correction controlling section for controlling the fifth mode performed by the correcting section.

* * * * *